US012780675B2

(12) United States Patent
Verboekend et al.

(10) Patent No.: US 12,780,675 B2
(45) Date of Patent: Nov. 3, 2026

(54) MESOPOROUS ZEOLITES PREPARED BY ALKALINE TREATMENT WITH PRECIPITATES

(71) Applicant: ZEOPORE TECHNOLOGIES NV, Leuven (BE)

(72) Inventors: Danny Verboekend, Leuven (BE); Martin D'Halluin, Leuven (BE)

(73) Assignee: ZEOPORE TECHNOLOGIES NV, Leuven (BE)

( * ) Notice: Subject to any disclaimer, the term of this patent is extended or adjusted under 35 U.S.C. 154(b) by 758 days.

(21) Appl. No.: 17/786,782

(22) PCT Filed: Dec. 23, 2020

(86) PCT No.: PCT/EP2020/087755
§ 371 (c)(1),
(2) Date: Jun. 17, 2022

(87) PCT Pub. No.: WO2021/130303
PCT Pub. Date: Jul. 1, 2021

(65) Prior Publication Data

US 2023/0051097 A1 Feb. 16, 2023

(30) Foreign Application Priority Data

Dec. 23, 2019 (EP) .................................... 19219217

(51) Int. Cl.
*C01B 39/02* (2006.01)
*C01B 39/24* (2006.01)
(Continued)

(52) U.S. Cl.
CPC ............ *C01B 39/026* (2013.01); *C01B 39/24* (2013.01); *C01B 39/32* (2013.01); *C01B 39/38* (2013.01); *C01B 39/46* (2013.01); *C01B 39/54* (2013.01)

(58) Field of Classification Search
None
See application file for complete search history.

(56) References Cited

U.S. PATENT DOCUMENTS 5,952,259 A * 9/1999 Drake ...................... B01J 37/06 502/77
2006/0122053 A1* 6/2006 Beeckman .............. B01J 29/40 502/64
(Continued)

FOREIGN PATENT DOCUMENTS

CN 103191770 * 7/2013
CN 103721739 * 4/2014
(Continued)

OTHER PUBLICATIONS

Kim, et al. "Acid Attack Theory of Dealumination of Cation-Exchanged FAU". Journal of Catalysis. 115, 319-325 (1989). (Year: 1989).*
(Continued)

*Primary Examiner* — Sheng H Davis
(74) *Attorney, Agent, or Firm* — DINSMORE & SHOHL LLP

(57) ABSTRACT

The present invention relates to processes for the preparation of mesoporous zeolites by post-synthetic technologies, the properties of resulting materials, and the use of the resulting materials as catalysts in the refining and petrochemical industry.

16 Claims, 1 Drawing Sheet

(51) Int. Cl.

| | |
|---|---|
| ***C01B 39/32*** | (2006.01) |
| ***C01B 39/38*** | (2006.01) |
| ***C01B 39/46*** | (2006.01) |
| ***C01B 39/54*** | (2006.01) |

(56) References Cited

U.S. PATENT DOCUMENTS

| | | | | |
|---|---|---|---|---|
| 2011/0132807 | A1 | 6/2011 | Zhan | |
| 2013/0183231 | A1* | 7/2013 | Senderov | B01J 29/082 423/700 |
| 2014/0080697 | A1 | 3/2014 | Long et al. | |
| 2019/0375724 | A1 | 12/2019 | Gordillo et al. | |

FOREIGN PATENT DOCUMENTS

| | | | | |
|---|---|---|---|---|
| CN | 103979573 | * | 8/2014 | |
| CN | 105233855 | * | 1/2016 | |
| CN | 105314652 | * | 2/2016 | |
| CN | 105771885 | * | 7/2016 | |
| CN | 108069501 | * | 5/2018 | |
| CN | 108097297 | * | 6/2018 | |
| CN | 109107526 | * | 1/2019 | |
| EP | 2308596 | * | 7/2009 | |
| EP | 2308596 | A1 * | 4/2011 | B01D 53/9418 |
| JP | 2012024674 | * | 2/2012 | |
| TR | 201608279 | * | 10/2016 | |
| WO | 2017009664 | A1 | 1/2017 | |

OTHER PUBLICATIONS

Lechert, Hans “The pH Value and its importance for the Crystallization of zeolites”. Elsevier Science B.V. (2001). (Year: 2001).*

Dapsens et al. “Highly Selective Lewis Acid Sites in Desilicated MFI Zeolites. .”. Chem. Sus. Chem. 6, 931-839. 2013 (Year: 2013).*

International Search Report and Written Opinion mailed May 21, 2021 in reference to co-pending European Application No. PCT/EP2020/087755 filed Dec. 23, 2020.

Verboekend, et al., “Hierarchical Fau-and LTA-Type Zeolites by Post-Synthetic Design: A New Generation of Highly Efficient Base Catalysts”, Advanced Functional Materials, vol. 23, No. 15, pp. 1923-1934, Apr. 19, 2013, XP055117151.

European Search Report based on European Application No. 19219217 f. Dec. 23, 2020.

* cited by examiner

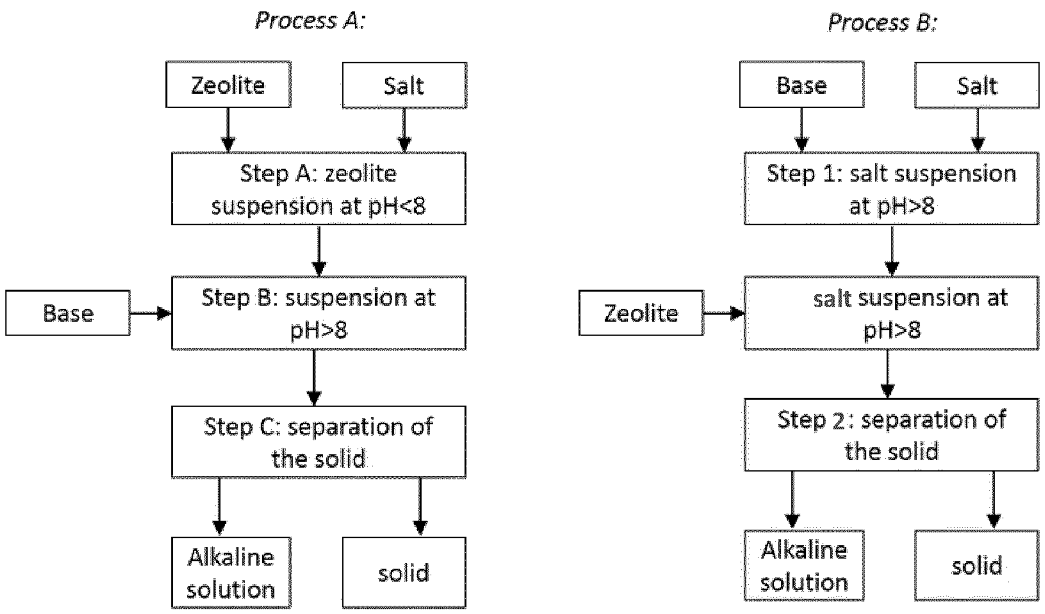
Process A:
Zeolite
Salt
Step A: zeolite suspension at pH<8
Base
Step B: suspension at pH>8
Step C: separation of the solid
Alkaline solution
solid
Process B:
Base
Salt
Step 1: salt suspension at pH>8
Zeolite
salt suspension at pH>8
Step 2: separation of the solid
Alkaline solution
solid

MESOPOROUS ZEOLITES PREPARED BY ALKALINE TREATMENT WITH PRECIPITATES

CROSS REFERENCES TO RELATED APPLICATIONS

This application is a national-stage application under 35 U.S.C. § 371 of International Application No. PCT/EP2020/087755, filed Dec. 23, 2020, which International Application claims benefit of priority to European Patent Application No. 19219217.7, filed Dec. 23, 2019.

FIELD OF THE INVENTION

The present invention relates to processes for the preparation of mesoporous zeolites by post-synthetic technologies, the properties of resulting materials, and the use of the resulting materials as catalysts in the refining and petrochemical industry.

BACKGROUND TO THE INVENTION

Mesoporous zeolites, SAPOs, and AIPOs attract substantial attention because of their potential advantages in catalysis due to their high external surface area, reduced diffusion path lengths, and exposed active sites. The introduction of a secondary network of mesopores (typically in the range of 2-50 nm) leads to substantial changes in the properties of materials, which gives an advantage over conventional mostly-microporous zeolites in application areas such as catalysis and separations. Accordingly, these materials have attained superior performance in many catalytic reactions, such as cracking, alkylations, and isomerisations.

Mesoporous zeolites can be made using bottom-up and top-down procedures. Bottom-up procedures imply a change in the hydrothermal synthesis of the zeolites, for example by using organic templates or by lengthening the crystallization time. However, the most industrially attractive variant may be the (top-down) post-synthetic modification of conventional commercially-available microporous zeolites. A key treatment in the latter category is base treatment (hereinafter also called 'base leaching'). This approach entails contacting conventional zeolites with alkaline aqueous solutions, yielding mesoporous zeolites by removing part of the solid to give way to intra-crystalline or inter-crystalline mesopores. Base treatments enable to convert most conventional zeolites (including SAPOs and AIPOs) into superior mesoporous analogues.

Despite the catalytic advantages, the currently available base leaching processes are associated with several synthetic disadvantages reducing their commercial appeal. First, base leaching typically gives rise to significant losses of the solid, which has a negative influence on the affordability of the resulting mesoporous zeolite. The efficiency of the leaching process, often expressed by relating the amount of mesopore volume or surface formed to the amount of solid removed from the solid, varies strongly with the specifics of each zeolite, such as the framework topology or bulk composition (Si/Al ratio or the $SiO_2/Al_2O_3$ ratio, the latter referred to as SAR). This efficiency can be enhanced by adding certain species to the alkaline solution prior to the addition of the zeolite. For example, the use of organic molecules such as tetrapropylammonium bromide (TPABr) has been reported to enhance mesopore formation in ZSM-5 and silicalite-1 zeolites.

Second, base treatments often lead to a pronounced reduction of the intrinsic zeolite properties (such as microporosity, Brønsted acidity, and crystallinity) by amorphization of the zeolite framework (forming amorphous silica alumina). The latter can occur particularly pronounced when the alkaline-mediated mesopore formation of zeolites with 12MR pores (USY and beta zeolite) is attempted. In these cases, the addition of organics, such as TPABr or amines, to the alkaline solution have been reported to prevent the amorphization during mesopore formation in alkaline media.

Third, although effective in enhance leaching efficiency and micropore preservation, the use of organics, such as TPABr and cetyltrimethyl-ammonium bromide (CTABr), is industrially not attractive. Their use is preferably avoided as they are costly ingredients and they typically need to be removed by combustion. Not only does this process destruct the costly organics, the formed combustion products need to be carefully taken care of, which is a hazardous and costly procedure in itself. It is therefore of eminent importance to reduce the use of organics in any zeolite synthesis.

Besides the amount of secondary porosity in a zeolite, the quality of the mesopores is of importance. Base leaching may give rise to mesopores that are (partially) cavitated. Cavitation may influence the accessibility to the active sites and have a direct impact on the catalytic performance. It was proven for selected reactions, such as methanol-to-olefins, that cavitation has a negative effect on the catalytic performance. The amount of occlusion is often more pronounced when organics are included in the alkaline solution.

Therefore, it was an object of the current invention to provide an organic-free base leaching process that yields a similar mesopore formation effect as the currently available base leaching processes, but is more efficient (higher amount of mesoporosity per unit mass removed) and results in solids comprising high intrinsic zeolitic properties and a reduced degree of cavitation.

Moreover, catalysts in which zeolites are commercially used are often designed such to include metals or metal oxides. These are included in the catalyst for specific beneficial effects on the catalytic conversion, in terms of increased activity, selectivity or life time. For example, in hydrocracking reactions typically Ni and Mo metals are included in USY-based catalysts.

Alternatively, Zn and Ga are often included in the conversion of aromatics using ZSM-5 based catalysts.

Such metal species are most commonly deposited on the zeolite by means of incipient wetness impregnation (IWI), involving the contacting of the zeolite's porosity with a metal containing solution, followed by subsequent drying and further activation steps. Depending on the metal type and targeted content, such deposition method can have as disadvantage that the dispersion of the metals can be low. Metal deposition by IWI can give rise to a rise in Lewis acidity, at the expense of the intrinsic Brønsted acidity. Moreover, metals deposited using the IWI technique are readily removed in slightly acid solutions, such as those present during ion exchange procedures. Accordingly, the IWI is typically the last step in the preparation of a metal and zeolite-based catalyst.

Within the deposition of metals on zeolites, the present invention provides great potential, in providing a preparative technology for making mesoporous zeolites; which technology enables also to tune the deposition of metal species on the zeolite, yielding higher metal dispersions, a higher metal retention upon exposure to acidic media, unprecedented Lewis acidities, and a more preserved Brønsted acidity.

Treated Materials: Difference with State of the Art Technologies to Make Zeolite/Metal (Hydroxide) Composites The deposition of metals on zeolites is a long established discipline, in which mesopore formation in the zeolite fraction has rarely been a topic of discussion. The deposition of metals often occurs in the pH range typical of readily-dissolved metal species in watery solutions, such as metal nitrates, that is, in the range pH<5 (such as in US2011/0132807). Such metal containing solutions are used to impregnate the larger part of the porosity of porous solid, such as a zeolite powder or extrudate, followed by drying of the resulting impregnated solid and activation by calcination. This process, also referred to 'incipient wetness impregnation' yields a porous bifunctional metal/zeolite, which has no similarities to the current invention as the pH is at no stage in the process alkaline.

Moreover, the current invention is much different to the established methods to make metal/zeolite composites based on execution and effect of ion exchanges. In the state of the art the ion exchange (often needed to obtain the catalytically active form of the zeolite) is typically executed prior to the deposition of the metals, as otherwise the bulk of the deposited metal is again removed (as demonstrated in Example 83). In the invention, the ion exchange is executed after the involvement and partial deposition of suitable metal salts, and also displays a much higher retention of deposited metals (see Example 74).

The precipitation of metal (hydroxides/oxides) using controlled pH manipulations is another established technological domain to deposit metals on zeolites (such as for example disclosed in US2014/0080697 and WO2017/009664). It should be nevertheless unambiguously clear to any person skilled in the art, that the mesopore formation by base treatment of the present invention is a totally different discipline compared to metal deposition by precipitation by pH variation as disclosed in the prior art. First and foremost, the aim of the treatment is very different: In the state of the art the aim is to deposit on a controlled manner copious amounts of metal species on top of the zeolite, and mesopore formation within the zeolite fraction, and all the embodiments this invention features, are not a topic of discussion.

For example, within the state of the art metal deposition the base merely functions to precipitate the salts. Whereas mesopore formation typically occurs in the pH range of over 11, the deposition of metal is typically executed at ca. 100-10000 times less alkaline conditions in the pH range 7-8 (US2014/0080697) or pH range 9-10 (WO2017/009664). This implies that technology developed for mesopore formation cannot (suitably) be used for targeted metal deposition, and vice versa.

Similarly, the solid yields in the state of the art metal deposition are typically a lot higher than 100% (in the range of 150-300%) as no zeolite dissolution is targeted and high amounts of metal species are strived after. The resulting materials can feature increased external surface, but this is solely attributed to the deposited metal species, and not the mesoporosity in the zeolite fraction. For example, as evidenced in Examples 77-80, in the case these species are removed (via a subsequent acid treatment for example), the external surface is typically also removed. Conversely, in the case of the invention, executing of a subsequent acid treatment typically induces a gain in porosity on all accounts.

Finally, specific to the case of the deposition of layered double hydroxides (LDH) species on zeolites, such as disclosed in WO2017/009664, the presence of a desired anion salt is required. Not only is such requirement completely absent in the present invention, the need for anionic salts as described in the prior art is typically achieved by adding sodium carbonate to a watery zeolite suspension. Doing so implies that the zeolite is able to react under alkaline conditions (see Comparative Example 79) without the beneficial use of metal hydroxides, being totally different compared to embodiments of the current invention.

SUMMARY OF THE INVENTION

The present invention provides for a process for increasing mesoporosity in zeolites comprises the consecutive steps: a) preparing a suspension of a zeolite in an aqueous solution of pH<8 in which at least one salt with an 'Acid Solubility'>95% and 'Alkaline Solubility'<95% is dissolved, b) adding a base to the suspension of step a), thereby increasing the pH>8, and letting react said base in the suspension thereby increasing the mesoporosity of the zeolite and c) isolating the zeolite from the suspension of step b).

In a next embodiment, the process for increasing mesoporosity in zeolites is further characterized in that the salt of step a) contains a group two element of the Periodic table, selected from the list comprising: magnesium, calcium, strontium and barium.

In a further embodiment, the process for increasing mesoporosity in zeolites is further characterized in that the salt of step a) contains an element selected from the list comprising: titanium, zirconium, vanadium, tin, chromium, manganese, iron, cobalt, nickel, copper, zinc, lanthanum and cerium; in particular titanium, zirconium, vanadium, tin, chromium, manganese, iron, cobalt, nickel, copper and zinc.

In another embodiment, the process for increasing mesoporosity in zeolites is further characterized in that a complementary acid step (herein also referred to as complementary acid treatment step) performed after step c).

In yet another embodiment, the process for increasing mesoporosity in zeolites is further characterized in that the zeolite features a framework topology selected from the list comprising: the FAU, BEA, MFI, MOR, TON, MTT, BEA, CHA, AEL, LTL, MTW, MWW, MEL, FER, MRE, or EUO framework topology; in particular the FAU, BEA, MFI, MOR, TON, MTT, BEA, CHA, AEL, LTL, MTW, MWV, MEL, FER, or EUO framework topology.

In a further embodiment, the process for increasing mesoporosity in zeolites is further characterized in that said base is added gradually in step b).

In a next embodiment, the process for increasing mesoporosity in zeolites and further comprising a complementary acid treatment step performed after step c) is further characterized in that the complementary acid treatment step is executed gradually.

In a further embodiment, the process for increasing mesoporosity in zeolites is further characterized in that the amount of salt added in step a) varies between 0.01 and 2 gram of salt per gram of zeolite.

In yet another embodiment, the process for increasing mesoporosity in zeolites is further characterized in that the base is an inorganic base selected from the list comprising: NaOH, KOH, CsOH, LiOH and $NH_4OH$.

In a next embodiment, the process for increasing mesoporosity in zeolites and further comprising a complementary acid treatment step performed after step c) is further characterized in that the complementary acid treatment step is performed using an inorganic acid selected from the list comprising: HCl, $HNO_3$, $H_2SO_4$, $H_3PO_4$ and $H_3BO_3$.

In a further embodiment, the process for increasing mesoporosity in zeolites and further comprising a complementary acid treatment step performed after step c) is further characterized in that the complementary acid treatment step is performed using one or more organic acids selected from the list comprising: oxalic acid, malic acid, citric acid, acetic acid, benzoic acid, formic acid, mono-, di-, and tri-sodium citrates, ethylenediaminetetraacetic acid ($H_4EDTA$), disodium ethylenediaminetetraacetic acid ($Na_2H_2EDTA$); in particular oxalic acid, citric acid, acetic acid, benzoic acid, formic acid, ethylenediaminetetraacetic acid ($H_4EDTA$), disodium ethylenediaminetetraacetic acid ($Na_2H_2EDTA$).

In another embodiment, the process for increasing mesoporosity in zeolites is further characterized in that step b) is executed at a temperature in the range of from 25° C. to 100° C., over a time period in the range of from 1 minute to 6 hours, a solid-to-liquid ratio of 5 to 300 g per liter, and the concentration of base is in the range of 0.5 to 25 mmol base per gram of zeolite added in step a).

In yet another embodiment, the process for increasing mesoporosity in zeolites and further comprising a complementary acid treatment step performed after step c) is further characterized in that the complementary acid treatment step is performed at a temperature in the range of from 25° C. to 100° C., over a time period in the range of from 15 minutes to 24 hours, wherein the aqueous solution has a solid-to-liquid ratio of 10-300 g per liter, and the concentration of acid is in the range of 0.25 to 50 mmol per gram of zeolite obtained in step c).

In another embodiment, the process of increasing mesoporosity in zeolites is further characterized in that a complementary ion exchange treatment is executed after step c); or where applicable a complementary ion exchange treatment is executed after the complementary acid treatment step.

In a particular embodiment of the present invention, said ion exchange treatment is executed using a watery solution containing an ammonium salt, and wherein said ion exchange treatment step is performed at a temperature in the range of from 25° C. to 100° C., over a time period in the range of from 15 minutes to 24 hours, wherein said aqueous solution has a solid-to-liquid ratio of 10-300 g per liter, and a concentration of ammonium salt in the range of 0.25 to 50 mmol per gram of zeolite.

In yet a further embodiment of the present invention, said ammonium salt is selected from the list comprising: ammonium nitrate, ammonium sulphate, ammonium chloride, ammonium hydroxide, ammonium carbonate, mono-ammonium phosphate, di-ammonium phosphate, or ammonium acetate.

In a further embodiment, a zeolite obtainable by the process for increasing mesoporosity in zeolites is disclosed.

In a specific embodiment, the present invention further provides a zeolite with the MFI topology, an atomic Si/Al ratio of at least 60, a $V_{micro,0.01}$ of at least 0.10 ml $g^{-1}$, a $V_{meso,0.2-1}$ of at least 0.30 ml $g^{-1}$, and a Lewis acidity (L) as measured with pyridine of at least 100 μmol $g^{-1}$.

In yet a further embodiment, the present invention provides a zeolite with the FAU topology, an atomic Si/Al ratio of at least 3.5, a $V_{micro}$ of at least 0.18 ml $g^{-1}$, a $V_{meso}$ of at least 0.30 ml $g^{-1}$, and a Lewis acidity (L) as measured with pyridine of at least 250 μmol $g^{-1}$.

In a following embodiment, a faujasite zeolite with unit cell size smaller than 24.38 A, obtainable by the process for increasing mesoporosity in zeolites, comprising: a $V_{meso}$ exceeding 0.40 ml $g^{-1}$, a $V_{micro}$ exceeding 0.15 ml $g^{-1}$ and a magnesium content of minimum 0.1 wt % and maximum 20 wt % is disclosed.

In a next embodiment, a faujasite zeolite with unit cell size smaller than 24.38 A, comprising: a $V_{meso}$ exceeding 0.40 ml $g^{-1}$, a $V_{micro}$ exceeding 0.15 ml $g^{-1}$ and a magnesium content of minimum 0.1 wt % and maximum 20 wt % is disclosed.

In a further embodiment, a ZSM-23 zeolite obtainable by the process for increasing mesoporosity in zeolites, comprising: a $V_{meso}$ exceeding 0.55 ml $g^{-1}$ and a $V_{micro}$ exceeding 0.06 ml $g^{-1}$ is disclosed.

In yet another embodiment, a ZSM-23 zeolite, comprising: a $V_{meso}$ exceeding 0.55 ml $g^{-1}$ and a $V_{micro}$ exceeding 0.06 ml $g^{-1}$ is disclosed.

In a next embodiment, a SSZ-13 zeolite obtainable by the process for increasing mesoporosity in zeolites, comprising: a $V_{meso}$ exceeding 0.15 ml $g^{-1}$, a $V_{micro}$ exceeding 0.18 ml $g^{-1}$ and an atomic Si/Al ratio of maximum 10 mol $mol^{-1}$ is disclosed.

In a following embodiment, a SSZ-13 zeolite, comprising: a $V_{meso}$ exceeding 0.15 ml $g^{-1}$, a $V_{micro}$ exceeding 0.18 ml $g^{-1}$ and an atomic Si/Al ratio of maximum 10 mol $mol^{-1}$ is disclosed.

In a next embodiment, a process for increasing mesoporosity in zeolites comprising the consecutive steps: 1) contacting a zeolite in an aqueous solution of pH>8 in which at least one salt with an 'Acid Solubility'>95% and 'Alkaline Solubility'<95% is present; 2) isolating the zeolite from the suspension of step 1) is disclosed.

BRIEF DESCRIPTION OF THE DRAWINGS

FIG. 1: Schematic overview of a process for increasing mesoporosity in zeolites according to an embodiment of the current invention (Process A, left) and a comparative prior art process (Process B, right).

DETAILED DESCRIPTION OF THE INVENTION

The present invention will be described with respect to particular embodiments and with reference to certain drawings, but the invention is not limited thereto. The drawings, as further described, are only schematic and non-limiting. In the drawings, some of the elements may not be drawn to scale for illustrative purposes. The dimensions and the relative dimensions do not correspond to the actual reductions to practice of the invention.

Furthermore, the terms first, second, further and the like in the description and in the claims are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a product comprising A and B" should not be limited to devices consisting only of components A and B. It means that with respect to the present invention, the relevant components of the product are A and B, and that further components such as C may be present.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

It is an advantage of the present invention that mesoporous zeolites can be prepared using a more efficient base leaching process, without the need for costly and toxic organic species. In one embodiment of the current invention, the first step of the process is to make a suspension of a zeolite and an aqueous solution at neutral (pH=7) or acidic pH (pH<7), in which is completely dissolved a salt which partially precipitates in alkaline conditions. The second step comprises increasing the pH of this suspension sufficiently to execute a controlled alkaline treatment. The resulting mesoporous zeolites are obtained at surprisingly high solid yields, and display superior porous properties, based on micro- and mesoporosity profiles, limited mesopore cavitation, based on the acidity profile, and—if present—based on the dispersion of metal species.

It is also an advantage of the present invention that resulting mesoporous zeolites provide advantageous performance in catalyzed reactions, based on the superior porosity and/or the favorable deposition of metal species via the base-induced precipitation.

It a further advantage of the present invention that the invention yields mesoporous zeolites which are very easily recovered from the alkaline media.

Various embodiments of the invention relate to the preparation of a mesoporous zeolite, which are illustrated in FIG. 1 (left).

In an embodiment, the mesoporous material (i.e. zeolite) may be prepared by bringing an untreated zeolite in suspension with an aqueous solution of neutral or acidic pH, in which is dissolved at least one specific type of salt (Step A). The latter salt may be of the nature that it completely or near-completely dissolves in acidic or neutral solutions, and of which the cation or anion may completely or partially precipitate when the aqueous solution is alkaline. Said suspension of the zeolite in the salt-containing aqueous solution of step A may then be contacted with a base in order to increase the pH to 8 or higher and hereby initiate the precipitation of the salt and mesopore formation (Step B). After the suspension has been reacted in alkaline media for a specific amount of time, the suspension may be separated (Step C).

In some embodiments, the steps A, B and C are consecutive steps.

In some embodiments, after the execution of steps A, B and C, a subsequent acid treatment, may be performed with the aim of tuning the porosity and composition of the zeolite.

In some embodiments, the resulting mesoporous zeolite may be exposed to further post-synthetic steps, such as ion exchange treatments and calcination targeted to obtain the active (protonic) form of the zeolite.

Furthermore, in some embodiments, the resulting mesoporous zeolite may be used in a number of commercially relevant catalytic and non-catalytic applications.

The following terms are provided solely to aid in the understanding of the invention.

As used herein, and unless otherwise specified, the term "base treatment" or "base leaching" refers to contacting conventional zeolites with alkaline aqueous solutions, yielding mesoporous zeolites by removing part of the solid to give way to intra-crystalline or inter-crystalline mesopores. Base treatments enable to convert most conventional zeolites (including SAPOs and AIPOs) into superior mesoporous analogues.

Certain types of zeolites, such as ZSM-5 or ZSM-23, are made hydrothermally using organic templating cations, such as TPAOH or tetraethylhydroxide. After hydrothermal synthesis these organic templates remain typically trapped in the zeolite's micropores, making the micropore inaccessible and therefore reducing a large part of the zeolite's porosity. Only after calcination, resulting in the removal of the organic species by its heat-induced destruction, is the zeolite's full (micro)porosity obtained. The various embodiments of the invention can be applied to template-free, template-containing, or partially de-templated zeolites.

As used herein, and unless otherwise specified, the term "porous substances" refers to substances which are divided by pore size, for example, pore sizes smaller than 2 nm classified as microporous substances, between 2 and 50 nm classified as mesoporous substances and larger than 50 nm classified as macroporous substances.

Non-zeolitic mesoporous silicas, such as MCM-41 and SBA-15, can display substantial microporosity. This type of microporosity is however 'non-ordered' and not well-defined and should not be considered zeolitic. As used herein, and unless otherwise specified, the term "microporosity" is derived primarily from the zeolitic micropores related to the framework topologies. For example, for the USY zeolites with faujasite topology the microporosity is derived from the well-defined 0.74 nm micropores, for zeolite beta with BEA topology the microporosity stems from the well-defined 0.6 nm pores, and for zeolite ZSM-5 with MFI topology the microporosity stems from the well-defined 0.55 nm pores.

The un-treated zeolite can comprise a variety of different crystal sizes. For example, the zeolite can comprise relatively large μm-sized crystals or crystals with sizes below 100 nm, typically referred to as 'nanozeolites'. As used herein, and unless otherwise specified, the term "Nanozeolites" may refer to zeolites crystals with sizes below 100 nm which can often be identified by a pronounced macroporosity, which correlates to a pronounced uptake (>100 $cm^3$ $g^{-1}$ volume adsorbed at standard temperature and pressure) at p/p0>0.9 in nitrogen sorption analysis executed at 77 K. Nanozeolites can have as disadvantage that state of the art base leaching methods can make the crystals or crystal clusters fall apart, yielding a colloidal suspension from which the solids are very hard to recover, and need to be recovered by laborious and costly (ultra)centrifugation (as described in more detail in U.S. Pat. No. 9,133,037). The current invention, however, yields mesoporous zeolites which are very easily recovered from the alkaline media, using fast and cost-effective separation techniques, for example using Buchner filtration or plate filtration.

Part of the invention relates to the dissolution or precipitation of salts in aqueous media of varying pH. As used herein, and unless otherwise specified, the term 'salt' refers to a combination of cation and anion, and does not imply anything else, such as whether it is dissolved or the state of aggregations, such as a solid or a liquid. For example, HCl, NaCl, NaOH, $Ba(NO_3)_2$, $Ca(NO_3)_2$, Ti-propoxide, $Cu(NO_3)_2$, $Fe(NO_3)_3$, $Mn(NO_3)_2$, $Zn(NO_3)_2$, $Co(NO_3)_2$, $(NH_4)_6Mo_7O_{24}$, $Ni(NO_3)_2$, $SnCl_2$, $SnSO_4$ and $Mg(NO_3)_2$ are all referred to as salts.

As used herein, and unless otherwise specified, the term "suitable salts" refers to salts that completely dissolve at low pH values and that do not or partially dissolve at high pH value, such as $Mg(NO_3)_2$, Ti-propoxide, $Cu(NO_3)_2$, and $Fe(NO_3)_3$. This criterion sets the suitable salts apart from other salts than have been used in the prior art base treatment of zeolites aimed at mesopore formation, such as TPABr, aluminum and gallium nitrates, and sodium chloride, all of which tend to fully dissolve at high pH.

That being said, any salt that completely or near-completely dissolves at pH values higher than 8 is not within the embodiments of the invention and, therefore, not regarded as a suitable salt. Examples of such unsuitable salts are several salts containing a group one element of the Periodic table such as most basic salts, such as NaCl, KBr and $NaNO_3$. Other salts that are outside the scope are $Al(NO_3)_3$ and $Ga(NO_3)_3$, and most tetraalkylammonium salts (such as TPABr or CTABr).

In order to provide preferred solubility ranges, one could consider using the reaction constant of the solubility product ($K_{sp}$), as is described in suitable literature such as 'Physical Chemistry' ($9^{th}$ edition), Peter Atkins (ISBN-13: 978-1429218122). However, such $K_{sp}$ values do not provide a clear range for describing the nature of the suitable salts as they are highly sensitive to variations in experimental conditions such as in pH, temperature, and concentrations.

However, in order to provide for a useful criterion of solubility which is most relevant for the current invention, two definitions of solubility were defined experimentally: an 'acid solubility' and an 'alkaline solubility' (Table 1). As used herein, and unless otherwise specified, the term "acid solubility" relates to the amount of a salt that remains in solution after the salt has been reacted with an $HNO_3$ solution and is expressed as a percentage. The acid solubility is analyzed by adding in one go 2.50 mmol of a salt to 50 ml of a 0.5 M $HNO_3$ solution, which is stirred and maintained at 65° C. in a round-bottom flask for 30 min. Afterwards any solid is separated from the liquid using a Buchner filtration set-up equipped with glass micro fiber filters (90 mm id, 1.2 um pore size). The acid solubility is then determined by deducting from 100 the solid yield in % from the total weight of salt added (Type 1). As shown in Table 1, both state of the art and suitable salts display 100% acid solubility. Accordingly, the related solubility expressed based on the percentage of mols dissolved is also 100% for all state of the art salts (Type 2 in Table 1).

As used herein, and unless otherwise specified, the term "alkaline solubility" relates to the amount of a salt that remains in solution after the salt has been reacted with a NaOH solution and is expressed as a percentage. The experiment is performed by adding in one go 2.50 mmol of a salt to 45 ml of water (solution A), which is stirred and maintained at 65° C. in a round bottom flask. Then, 5 ml of a 5 M NaOH solution is added dropwise to solution A over the course of 30 min. Afterwards, the solids are separated from the liquid using a Buchner filtration set-up equipped with glass micro fiber filters (90 mm id, 1.2 um pore size). The alkaline solubility is then determined by deducting from a 100 the solid yield in % from the total weight of salt added (Type 1 solubility in Table 1). The suitable salts for the invention display an alkaline solubility that is lower than a 100%, unlike the salts used in the state of the art. In many cases, the reduction in alkaline solubility relates to the (near-complete) precipitation of the related metal hydroxide. In fact, when the solubility is calculated based on the molar weight of the associated metal hydroxide (Type 2 in Table 1), the experimental solubility is (close to) zero for most suitable salts.

Additionally, many accessible types of software are widely available to verify the solubility of salts in water via hydrochemistry calculations. This can for example be done using the free Aqion software, which can be used to combine the exact same amounts of acids and bases as described in the protocols to assess the experimental acid and alkaline solubility, respectively. The latter was performed for available salts with Table 1 ('Type 3' values). Herein, the treatments were simulated at 25° C., the base was not added gradually, salt precipitation was enabled, and equilibrium with atmospheric $CO_2$ was disabled. The theoretical solubilities agree well with the experimental values and provide a readily available tool to verify whether a salt is suitable for the invention (or not).

TABLE 1

Experimental and theoretical acid and alkaline solubilities of different state of the art and suitable salts used in base leaching of zeolites.

| | | Type 1 Experimental solubility Weight based | | Type 2 Experimental solubility mol-equivalent based | | Type 3 Theoretical solubility of mol-equivalent based | |
|---|---|---|---|---|---|---|---|
| Solubility type Salt | Type of example | Acid/ wt. % | Alkaline/ wt. % | Acid/ mol. % | Alkaline/ mol. % | Acid/ mol. % | Alkaline/ mol. % |
| $Al(NO_3)_3$ * 9 $H_2O$ | comparative example | 100 | 100 | 100 | 100 | 100 | 100 |
| $Al(OH)_3$ | comparative example | — | — | — | — | 100 | 100 |
| $Ga(NO_3)_3$ * $H_2O$ | comparative example | 100 | 100 | 100 | 100 | — | — |
| TPABr | comparative example | 100 | 100 | 100 | 100 | — | — |
| NaCl | comparative example | 100 | 100 | 100 | 100 | 100 | 100 |
| $Ba(NO_3)_2$ | example | 100 | 91 | 100 | 86 | 100 | 60 |
| $Ca(NO_3)_2$ * 4 $H_2O$ | example | 100 | 64 | 100 | 0 | 100 | 2 |
| $Ca(OH)_2$ | example | — | — | — | — | 100 | 2 |
| $CaCO_3MgO$ | example | — | — | — | — | 100 | 1 |
| Ti-propoxide | example | 100 | 59 | 100 | 0 | — | — |
| $Cu(NO_3)_2$ * 3 $H_2O$ | example | 100 | 60 | 100 | 1 | 100 | 1 |
| $Cu(OH)_2$ | example | — | — | — | — | 100 | 1 |
| $Fe(NO_3)_3$ * 9 $H_2O$ | example | 100 | 73 | 100 | 0 | 100 | 1 |
| $Mg(NO_3)_2$ * 6 $H_2O$ | example | 100 | 74 | 100 | 0 | 100 | 0 |
| $MgCl_2$ | example | — | — | — | — | 100 | 0 |
| $MgNH_4PO_4$ * 6 $H_2O$ | example | — | — | — | — | 100 | 0 |
| $Mn(NO_3)_2$ * 4 $H_2O$ | example | 100 | 62 | 100 | 0 | 100 | 0 |
| $Zn(NO_3)_2$ * 6 $H_2O$ | example | 100 | 70 | 100 | 10 | 100 | 38 |
| $Co(NO_3)_2$ * 6 $H_2O$ | example | 100 | 65 | 100 | 0 | 100 | 0 |
| $Ni(NO_3)_2$ * 6 $H_2O$ | example | 100 | 62 | 100 | 0 | 100 | 0 |
| $NiCO_3$ | example | — | — | — | — | 100 | 0 |
| $SnCl_2$ | example | 100 | 65 | 100 | 57 | 100 | 22 |
| $SnSO_4$ | example | 100 | 94 | 100 | 92 | 100 | 100 |
| $LaCl_3$ * 7 $H_2O$ | example | 100 | 62 | 100 | 0 | — | — |
| $CeCl_3$* 7 $H_2O$ | example | 100 | 57 | 100 | 0 | — | — |

A first embodiment of the current invention relates to a process for increasing mesoporosity in zeolites comprising the steps: a) preparing a suspension of a zeolite in an aqueous solution of pH<8 in which at least one salt with an 'Acid Solubility'>95% and 'Alkaline Solubility'<95% is dissolved, b) adding a base to the suspension of step a), thereby increasing the pH>8, and letting react said base in the suspension thereby increasing the mesoporosity of the zeolite and c) isolating the zeolite from the suspension of step b).

In another embodiment, the salt displays a weight- and molar-based acid solubility (Type 1, Type 2, and Type 3) preferably ranging from about 80 to 100%, more preferably from about 95-100%, and most preferably 98-100%; in particular equal to or above 95%, equal to or above 96%; equal to or above 97% equal to or above 98%, equal to or above 99%, about 100%.

In another embodiment, the salt displays a weight-based alkaline solubility (Type 1) preferably ranging from about 30 to 100%; in particular from about 40 to 90%; more in particular from about 50 to 80%; most specifically from about 55 to 75%.

In another embodiment, the salt displays a mol-equivalent based alkaline solubility (Type 2 and Type 3) preferably ranging from about 0 to 100%, more preferably from about 0 to 75%; more preferably from about 0-50%, even more preferably from about 0-30%; and most preferably from about 0-10%.

In a next embodiment, the current invention relates to the process for increasing mesoporosity in zeolites, further characterized in that the salt of step a) contains a group two element of the Periodic table, selected from the list comprising: magnesium, calcium, strontium and barium.

A following embodiment of the current invention relates to the process for increasing mesoporosity in zeolites, further characterized in that the salt of step a) contains an element selected from the list comprising: titanium, zirconium, vanadium, tin, chromium, manganese, iron, cobalt, nickel, copper, zinc, lanthanum and cerium; in particular selected from titanium, zirconium, vanadium, tin, chromium, manganese, iron, cobalt, nickel, copper and zinc.

Within the group of suitable salts, several other criteria exist which renders a salt more favorable. These criteria may be based on the efficiency of the salt in the mesopore formation, but also on the cost, toxicity, and potential role in catalyzed reactions. Different suitable salts can also be mixed with other suitable salts or with salts used in the state of the art in order to get an enhanced efficiency. Of the suitable salts, the cation is of the largest importance as its hydroxide can be the precipitating salt.

Suitable salt cations may comprise elements from Group 2 of the Periodic Table, such as beryllium, magnesium, calcium, strontium, and barium. Of this group of elements, magnesium and calcium are preferred elements.

Other suitable salt cations may comprise elements of Period 4 of the Periodic Table with atomic numbers ranging from 22 till 30, such as titanium, vanadium, chromium, manganese, iron, cobalt, nickel, copper, and zinc. The elements iron, zinc, nickel, cobalt, and cupper are preferred elements.

Other suitable salt cations may comprise elements of Period 5 of the Periodic Table with atomic numbers ranging from 40 till 50. The elements zirconium, molybdenum, and tin are preferred elements.

Other suitable salt cations may comprise rare earth elements, such as scandium, yttrium, lanthanum, cerium, praseodymium, neodymium, and samarium. The elements lanthanum and cerium are preferred elements.

Of the suitable salts, the anion is assumed to be generally less critical as the cation. Suitable anions are based on availability, cost, and on the influence on the acid and alkaline solubility. Suitable salt anions can be inorganic species such as $NO_3^-$, $PO_4^-$, $SO_4^-$, $Cl^-$, and Br and can also be common organic species such as alkoxides (such as in titanium propoxide) or those based on carboxylic acids such as acetate, citrate and malate.

In a preferred embodiment, the solvent used in the process for increasing mesoporosity in zeolites is water.

In some embodiments, the solid-to-liquid ratio, being the ratio of zeolite to liquid volume, preferably ranges from about 1, 2, 3, 4, 5, 6, 7, 8, 9, 10, 15, 20, 25, 30, 40 or 50 g $L^{-1}$ to 100, 110, 120, 125, 150, 200, 250, 300 or 400 g $L^{-1}$ and more preferably from about 1 to about 400, 10 to 300 or 20 to about 100 g $L^{-1}$. In the case of gradual treatments, this unit refers to the total amount of liquid brought in contact with the zeolite during the course of a treatment.

In some embodiments, the temperature may preferably range from about 10, 15, 20, 25 or 30 to 80, 85, 90, 95 or 100° C. and more preferably from about 10 to 100 or 50 to 70° C.

In some embodiments, some of the process steps may be performed at ambient pressure and others may be executed at elevated pressures.

The suspension in Step A may be prepared in several fashions, as long as the end result comprises a suitable amount of salt being in solution and the zeolite being suspended.

In some embodiments, the zeolite may be added to a stirred solution dissolved salt or the salt may be added to the stirred suspension of zeolite in water.

Some embodiments include impregnating the zeolite with a suitable amount salt, followed by introducing the obtained salt/zeolite composite to a stirred watery solution. The pH of the solution may be lowered, for example by adding small amounts of mineral acids, to ensure the salt is adequately dissolved. The time of interaction between the zeolite and the dissolved salt is assumed to be of minor influence.

In Step B, the pH of the suspension of Step A may be increased to a pH28 to neutralize the potentially acidic salt-containing solution, to hereby partially precipitate the salt, and to generate the alkaline conditions to induce mesopore formation in order to increase the mesoporosity of the zeolite. The required pH in Step B depends strongly on the nature of the to-be-treated zeolite and the used salt and varies preferably from pH 9 to 14, more preferably from pH 11 to 13.5, and most preferably from pH 12 to 13.

After Step B, the zeolite may be separated from the solution using established separation techniques such as Buchner filtration, plate filtration, or centrifugation (Step C). After said separation, the resulting solids may be washed with water in order to remove dissolved species from the solid, and finally dried in an oven to a desired level of humidity.

A further embodiment of the current invention relates to the process for increasing mesoporosity in zeolites, further characterized in that a complementary acid treatment step performed after step c).

After separation (Step C), an acid treatment may be performed on the resulting solid. This may be performed on any form of the solid after separation. For example, the acid treatment may be performed after the solid has been separated, washed, and dried, but can also be performed on the non-washed wet solid, and any form in between. The acid treatment can be executed in any required means a solid can be contacted with an acid. For example, it can be performed in a batch reactor (like Step B) but can also be performed by locating the porous solid on a membrane followed by flowing an acid solution through the solid-covered membrane. The latter may be performed, for example, directly after the solid has been recovered in Step C using a plate filter.

A next embodiment of the current invention relates to the process for increasing mesoporosity in zeolites, further characterized in that the zeolite features a framework topology selected from the list comprising: the FAU, BEA, MFI, MOR, TON, MTT, BEA, CHA, AEL, LTL, MTW, MWW, MEL, FER, MRE or EUO framework topology; in particular a framework topology selected from the list comprising: the FAU, BEA, MFI, MOR, TON, MTT, BEA, CHA, AEL, LTL, MTW, MWW, MEL, FER, or EUO framework topology.

As used herein, and unless otherwise specified, the term 'zeolite' may be defined as a crystalline material of which the chemical composition includes essentially aluminium, silicon and oxygen. Typically, zeolites are described as aluminosilicates with a three-dimensional framework and molecular sized pores. Certain zeolitic materials are ordered, porous crystalline aluminosilicates having a definite crystalline structure as determined by X-ray diffraction, within which there are a large number of smaller cavities which may be interconnected by a number of still smaller channels or windows. Zeolites are generally characterized by the equation, $H_xAl_xSi_{1-x}O_2$, where H can be replaced by any other univalent cation, such as sodium or potassium, or (when the x related to H is divided by the valence) a multivalent cation, such as magnesium or calcium. The term zeolite also refers to an open tetrahedral framework structure capable of ion exchange, and loosely held water molecules, that allow reversible dehydration.

The term 'zeolite' also includes 'zeolite-related materials' or 'zeotypes' which are prepared by replacing $Si^{4+}$ or $Al^{3+}$ with other elements as in the case of aluminophosphates (e.g., MeAPO, SAPO, ElAPO, MeAPSO, and ElAPSO), gallophosphates, zincophosphates, titanosilicates, etc. The zeolite can be a crystalline porous material with any fully ordered or partially disordered framework topology provided in the Zeolite Framework Types database of the International Zeolite Association (IZA) structure commission. Common suitable zeolite framework topologies are FAU, BEA, MFI, MOR, TON, MTT, BEA, CHA, AEL, LTL, MTW, MWW, MEL, FER, or EUO.

A further embodiment of the current invention relates to the process for increasing mesoporosity in zeolites, further characterized in that said base is added gradually in step b).

In some embodiments, the contacting of the base to the zeolite suspensions in Step B is executed in a 'stepwise' or 'gradual' fashion. Here, methods established in the state of the art (WO2017148852, for example) may be used.

In an embodiment, the maximum amount of base brought into contact with the zeolite during the period of preferably less than about 240, 120, 60, 30, 20, 10, 9, 8, 7, 6 or 5 minutes, more preferably less than about 4 minutes and most preferably less than about 3 minutes, is preferably not more than about 80 or 75%, more preferably not more than about 55 or 50% and most preferably not more than about 30, 29, 28, 27, 26 or 25% of the overall amount of base to be contacted with the solid over the course of Step B.

In some embodiments, the base may be dosed stepwise using a pump (for liquids) or powder doser (for solids). The addition rate of the base is preferably at most 10.0, 5.0 or 3.0 mmol per gram to be treated zeolite per minute, more preferably at most 1.5 or 1.0 mmol $g^{-1}$ $min^{-1}$ and most preferably at most 0.6 or 0.5 mmol $g^{-1}$ $min^{-1}$.

A next embodiment of the current invention relates to the process for increasing mesoporosity in zeolites and further comprising a complementary acid step (herein also referred to as complementary acid treatment step) performed after step c), further characterized in that the complementary acid treatment step is executed gradually.

In some embodiments, the contacting of the solid to the acid is executed gradually. When, like for the base treatment, such methods are applied to a batch reactor, it is preferred that the zeolite is initially brought into a suspension in water, followed by the gradual acid addition. It is preferred that the maximum amount of acid brought in contact with the zeolite during the period of preferably less than about 240, 120, 60, 30, 20, 10, 9, 8, 7, 6 or 5 minutes, more preferably less than about 4 minutes and most preferably less than about 3 minutes, is preferably not more than about 80 or 75%, more preferably not more than about 55 or 50% and most preferably not more than about 30, 29, 28, 27, 26 or 25% of the overall amount of acid to be contacted with the solid over the course of the treatment.

In some embodiments, the acid may be dosed stepwise during an acid treatment by using a pump (for liquids) or powder doser (for solids). The latter may be executed directly after the sample has been isolated in Step C. In addition, the acid can be contacted with the zeolite in a continuous stirred-tank reactor, or any other configuration, such as a membrane, that enables a gradual or stepwise contacting of the solid with the acid. The addition rate of the acid is preferably at most 5.0, 4.0, 3.0, 2.0 or 1.0 mmol per gram to be treated zeolite per hour, more preferably at most 0.6 or 0.5 mmol $g^{-1}$ $h^{-1}$ and most preferably at most 0.30, 0.29, 0.28, 0.27, 0.26 or 0.25 mmol $g^{-1}$ $h^{-}$.

A following embodiment of the current invention relates to the process for increasing mesoporosity in zeolites, further characterized in that the amount of salt added in step a) varies between 0.01 and 2 gram of salt per gram of zeolite.

The amount of salt with respect to the amount of zeolite to be treated (hereinafter also called: "preferred amount of suitable salt") can vary substantially per type of zeolite and per type of salt used. The preferred amount of suitable salt ranges preferably from about 0.01, 0.05 or 0.1 to about 5, 6, 7, 8, 9 or 10 mmol of salt per gram of zeolite, more preferably from about 0.25 or 0.3 to about 4.5 or 5 mmol $g^{-1}$, and most preferably from about 0.45 or 0.5 to about 1.7, 1.8, 1.9 or 2 mmol $g^{-1}$. The preferred amount of suitable salt also preferably ranges from about 0.001, 0.005, 0.01, 0.02, 0.03, 0.04 or 0.05 to about 3, 4, 5, 6 or 7 gram of salt per gram of zeolite, more preferably from about 0.01 to 5 or 0.045 or 0.05 to about 1.5, 2 or 2.5 g $g^{-1}$ and most preferably from about 0.24, 0.25 or 0.26 to about 0.95, 1 or 1.05 g $g^{-1}$. Preferred suitable salt concentrations preferably range from about 0.001, 0.002, 0.005, 0.01 or 0.02 to about 0.5, 0.75, 1, 1.1, 1.25 or 1.5 M, more preferably from about 0.01 to 0.5 M and most preferably from about 0.025, 0.03 or 0.035 to about 0.18, 0.19, 0.2, 0.21 or 0.22 M.

A next embodiment of the current invention relates to the process for increasing mesoporosity in zeolites, further characterized in that the base is an inorganic base selected from the list comprising: NaOH, KOH, CsOH, LiOH and $NH_4OH$.

Any base can be used in Step B as long as it is able to increase the pH to a value of 8 or higher. The preferred bases to make the alkaline solution are inorganic hydroxides such as NaOH, LiOH, KOH, RbOH, CsOH, $NH_4OH$ and $Mg(OH)_2$.

In some embodiments, inorganic non-hydroxides alkaline sources can be used such as $(NH_4)_2CO_3$, $Na_2CO_3$ and sodium hydride (NaH). In other embodiments, organic bases can be used, such as tetrapropylammonium hydroxide, diethylamine, dipropylamine, tetrabutylammonium hydroxide and tetraethylammonium hydroxide (TEAOH).

A following embodiment of the current invention relates to the process for increasing mesoporosity in zeolites and further comprising a complementary acid treatment step performed after step c), further characterized in that the complementary acid treatment step is performed using an inorganic acid selected from the list comprising: HCl, $HNO_3$, $H_2SO_4$, $H_3PO_4$ and $H_3BO_3$.

A further embodiment of the current invention relates to the process for increasing mesoporosity in zeolites and further comprising a complementary acid treatment step performed after step c), further characterized in that the complementary acid treatment step is performed using one or more organic acids selected from the list comprising: oxalic acid, malic acid, citric acid, monosodium-disodium- and trisodium citrate, acetic acid, benzoic acid, formic acid, ethylenediaminetetraacetic acid ($H_4EDTA$), disodium ethylenediaminetetraacetic acid ($Na_2H_2EDTA$).

The preferred acids to make the acidic solutions are mineral acids from the group of HCl, $HNO_3$, $H_2SO_4$, $H_3PO_4$, $H_3BO_3$.

In some embodiments, organic acids from the group of sulphonic acids such as methanesulfonic acid, ethanesulfonic acid, benzenesulfonic acid, and p-toluenesulfonic acid, may be used.

In some embodiments, organic acids from the group of carboxylic acids such as acetic acid, citric acid, malic acid, formic acid, gluconic acid, lactic acid, oxalic acid, tartaric acid may be used.

In some embodiments, organic acids from the group of aminopolycarboxylic acids, such as ethylenediaminetetraacetic acid (EDTA), Iminodiacetic acid (IDA), and 1,4,7,10-tetraazacyclododecane-1,4,7,10-tetraacetic acid (DOTA), may be used.

In some embodiments, only part of the carboxylic groups in the organic acids may be in the protonic (acidic) form such as monosodium-, disodium-, and trisodium citrate and $Na_2H_2EDTA$.

Yet another embodiment of the current invention relates to the activation of the materials by ion exchange treatments in watery solutions containing predominately ammonium cations.

Such treatment, common in the state of the art and optionally combined with heat treatment, enable to maximize the solid's acidity, often required for use in catalytic applications, by removal of unwanted cations such as sodium, potassium, lithium, and cesium.

Accordingly, in a specific embodiment, the present invention provides a process as defined herein wherein a complementary ion exchange treatment (IE) is executed after step c), or where applicable, a complementary ion exchange treatment is executed after the complementary acid step. In particular, the order of the post-synthetic treatment steps and manner of executing the ion exchange treatment is largely dependent on the targeted amount of remaining metals on the solid. For example, different scenarios could be envisaged:

1) No metals are targeted and the acid step is performed in a large excess of protons (and in the absence of undesired cations). In this case the acid removes >90% of the metals and at the same time removes sodium, potassium, or lithium (typically derived from the used base in Step B) leaving the zeolite in the protonic form, making a subsequent IE obsolete.
2) If all metals are to be removed (>90% removal), but the undesired cations are not completely removed during the acid treatment. In this case, the acid treatment is executed, followed by an IE in common ammonium salts, such as ammonium nitrate or ammonium sulphate, see examples E69, E74, E76, E82.
3) If some metal containing is strived after (20-90% removal), no acid step is performed, and only the IE is executed, see example E70.

Ion exchange treatments can be performed under similar process conditions as the methods for the acid treatment described herein, with the exception to the pH of the ion exchange which is not necessarily acidic and depends mostly on the nature of the use ammonium salt. Still, similar methods of contacting, temperatures, solid-to-liquid ratios, and times can be used to perform the ion exchange treatment. Moreover, to maximize the effect of the ion exchange, typically multiple sequential ion exchange treatments are performed.

In some embodiments, ion exchange is executed using ammonium nitrate, ammonium sulphate, ammonium chloride, ammonium hydroxide, ammonium carbonate, mono ammonium phosphate, di ammonium phosphate, and ammonium acetate.

A next embodiment of the current invention relates to the process for increasing mesoporosity in zeolites, further characterized in that step b) is executed at a temperature in the range of from 25° C. to 100° C., over a time period in the range of from 1 minute to 6 hours, a solid-to-liquid ratio of 5 to 300 g per liter, and the concentration of base is in the range of 0.5 to 25 mmol base per gram of zeolite added in step a).

The amount of base in step B varies preferably from about 0.1, 0.2, 0.3, 0.4, 0.5, 1, 2, 5, 10, 15 or 20 to about 40, 45, 50, 55, 60, 65, 70, 75 or 100 mmol of base per gram of zeolite, more preferably from about 0.5, 1, 1.5 or 2 to about 30, 35, 40, 45 or 50 mmol of base per gram of zeolite, and most preferably from about 2.5, 3 or 3.5 to 18, 19, 20, 21 or 22 mmol of base per gram of zeolite. The time of treatment can vary broadly from about 1 minute to 24 hours, but ranges preferably from about 1, 1.5, 2, 2.5 or 3 to about 120, 180, 200, 220, 240, 260, 280 or 300 minutes, more preferably from about 2, 3, 4, 5, 6, 7, 8, 9 or 10 to about 100, 110, 120, 130 or 140 minutes and most preferably from about 7, 8 or 9 to about 57, 58, 59, 60, 61, 62 or 63 minutes.

A following embodiment of the current invention relates to the process for increasing mesoporosity in zeolites and further comprising a complementary acid treatment step performed after step c), further characterized in that the complementary acid treatment step is performed at a temperature in the range of from 25° C. to 100° C., over a time period in the range of from 15 minutes to 24 hours, wherein the aqueous solution has a solid-to-liquid ratio of 10 to 300 g per liter and the concentration of acid is in the range of 0.25 to 50 mmol per gram of zeolite obtained in step c).

In a preferred embodiment, the solvent for the acid treatment may be water. Typical solutions to execute the acid treatment feature an overall pH varying from about pH 0, 1 or 2 to about pH 7, 8, 9 or 10, preferably from about pH 0.1, 0.2, 0.3, 0.4 or 0.5 to about pH 4.5, 5 or 5.5 and most preferably from about pH 0.3, 0.4, 0.5 or 0.6 to about pH 3.4, 4 or 4.5. The solid-to-liquid ratio (amount of solid to volume of the liquid) can vary preferably from about 1, 2, 3, 4, 5, 6, 7, 8, 9, 10, 15, 20, 25, 30, 40 or 50 g $L^{-1}$ to about 100, 110, 120, 125, 150, 200, 250, 300 or 400 g $L^{-1}$, more preferably from about 15, 20 or 25 to about 125, 150 or 175 g/L and most preferably from about 45, 50 or 55 to about 95, 100 or 105 g/L. The temperature may preferably range from about 10, 15, 20, 25 or 30 to about 80, 85, 90, 95 or 100° C., more preferably from about 30, 35, 40, 45 or 50° C. to about 80, 85, 90, 95 or 100° C. and most preferably from about 48, 49, 50, 51 or 52° C. to about 80, 85, 90, 95 or 100° C. The acid treatment time may preferably vary from about 0.05, 0.08, 0.09, 0.1, 0.2, 0.3, 0.5, 1, 5 or 10 to about 50, 60, 65, 70, 76 or 80 hours, more preferably from about 0.4, 0.5 or 0.6 to about 20, 21, 22, 23, 24, 25 or 26 hours and most preferably from about 0.9, 0.95, 1, 1.05 or 1.1 to about 4, 5, 6, 7 or 8 h. The concentration of acid is preferably in the range of 0.8, 0.9, 1.0, 1.1 or 1.2 to about 90, 95, 100, 105 or 110 mmol per gram of the to be treated solid, more preferably from about 0.90, 0.95, 1.0, 1.05 or 1.1 to about 48, 49, 50, 51 or 52 mmol per gram and most preferably from about 0.98, 0.99, 1.0, 1.01 or 1.02 to about 9.90, 9.95, 10.0, 10.05, 10.1 mmol per gram.

A further embodiment of the current invention relates to a zeolite obtainable by the process for increasing mesoporosity in zeolites.

Another embodiment of the present invention relates to a process for increasing mesoporosity in zeolites comprising the consecutive steps: 1) contacting a zeolite in an aqueous solution of pH>8 in which at least one salt with an 'Acid Solubility'>95% and 'Alkaline Solubility'<95% is present; II) isolating the zeolite from the suspension of step I).

$N_2$ Adsorption Technique

The properties of the to be treated and resulting solids may be assessed using nitrogen sorption at 77 K as it is a well-established technique to quantify the intrinsic zeotypical properties (relevant for crystalline microporous solids), as well as the secondary (meso)porosity in the solid. A descriptor that is derived from the nitrogen isotherm is the total surface area ($S_{BET}$), as it gives an indication of the overall porosity (micropores and mesopores) of the solids. The intrinsic zeotypical properties can be examined using the micropore volume ($V_{micro}$), which is derived from application of the t-plot to the adsorption branch of the isotherm. Since the zeolite's active sites are largely located in the micropores, it is preferred that upon post-synthetic modification using acid and base treatments the micropore volume remains as high as possible. The t-plot method simultaneously yields an external surface (referred to '$S_{meso}$') which is used as an indication for the degree of secondary porosity. The total pore volume ($V_{pore}$) is used as an indicator for the overall porosity. The mesopore volume is also an indicator of the amount of generated secondary porosity, and ($V_{meso}$) is defined as $V_{meso}=V_{pore}-V_{micro}$. It is generally thought most desirable to attain solids with the highest microporosity ($V_{micro}$) and mesoporosity ($S_{meso}$, $V_{meso}$), yielding in turn the high overall porosity ($S_{BET}$, $V_{Pore}$).

For high SAR MFI zeolites (with framework atomic Si/Al>ca. 75) a fluid to crystalline-like phase transition can give rise to a pronounced uptake 'step' in the range 0.15<p/p0<0.25 (Microporous and Mesoporous Materials 60 (2003) 1-17). This phenomenon is related to the interaction of the sorbate with MFI framework and not to any actual porosity.

This step has such a pronounced negative effect on the accuracy t-plot. Accordingly, herein, for such MFI zeolites, the microporosity and mesoporosity is estimated, not by the use of the t-plot, but by the volume of nitrogen sorbed at p/p0=0.01 (yielding $V_{micro,0.01}$) and the volume sorbed between 0.2≤p/p0≤1 (yielding $V_{meso,0.2-1}$), respectively.

Cavitation Process of Mesopores

The cavitation of mesopores can be suitably evidenced by nitrogen sorption at 77 K, as is described in the state of the art (Microporous and Mesoporous Materials 60 (2003) 1-17). Generally speaking, the hysteresis occurs in the relative pressure (p/p0) range of >0.4 and typically increases with the amount of mesopores and/or the degree of cavitation of the mesopores. The closing of the hysteresis between the two isotherms around 0.4<p/p0<0.5 is particularly insightful to assess the degree of cavitation. For the solids analysed herein, the volume of cavitated mesoporosity is determined by the difference in volume sorbed between the adsorption and desorption isotherm at a relative pressure of 0.5 (+/−0.005 p/p0). A percentage of cavitated mesoporosity is obtained by dividing cavitated mesopore volume by the total mesopore volume ($V_{meso}$), followed by multiplication with one hundred.

$N_2$ Conditions and Sorption Measurements

As used herein, the micropore volume ($V_{micro}$), mesopore volume ($V_{meso}$), mesopore surface area ($S_{meso}$), total pore volume ($V_{pore}$), and total surface area ($S_{BET}$) were obtained using nitrogen sorption analysis at 77 K. Nitrogen-sorption measurements were executed using a Micromeritics TriStar II instrument, controlled by TriStar 3020 software (Micromeritics) version 3.02. Prior to the sorption experiment, the samples were degassed overnight under a flow of $N_2$ with heating to 300° C. The $S_{BET}$ was attained by application of the BET model to the adsorption branch of the isotherm in the range of p/p0=0.05-0.35. The $V_{micro}$ and $S_{meso}$ were obtained by using the t-plot. The t-plot method, as described in Microporous Mesoporous Mater. 2003, 60, 1-17, was used to distinguish between micro- and mesopores (thickness range=0.35-0.50 nm, using thickness equation from Harkins and Jura, and density conversion factor=0.0015468). To accurately compare the microporosity derived from the t-plot among solids, it is preferred that the same t-plot method and thickness range and thickness equation are used. The $V_{Pore}$ was obtained at p/p0=0.99.

Mesopore Volume Efficiency Measurement: MVE

An important aspect within the invention is the efficiency of mesopore formation. This is assessed by the normalization of the generated mesoporosity to the weight loss invoked upon the zeolite mass. This value should be as high as possible, and is herein calculated by dividing the change in mesopore volume ($dV_{meso}$, in ml $g^{-1}$) by the percentage of mass loss during the treatment in percentage, resulting in the unit "ml $g^{-1}$ $\%^{-1}$" (or when multiplied by a thousand: "μl $g^{-1}$ $\%^{-1}$"), and is referred to as the 'mesopore volume efficiency' abbreviated as 'MVE'. Within this unit, the percentage of weight loss is calculated as the mass of the zeolite prior to treatment minus the mass of the solid after the treatment, divided by the mass of zeolite prior to the treatment times a hundred. The delta mesopore volume ($dV_{meso}$) is obtained by deducting the mesopore volume of the parent zeolite from the mesopore volume of the treated material.

The Relation Between Water Content in the Parent Zeolite and the MVE

The relative water content in the parent zeolite and the treated zeolites after drying are important, as this has a direct influence on calculating the MVE. Whereas it is practically unrealistic to ensure similar degrees of hydration of the zeolite at all times, the relative differences in humidity content between the parent and treated zeolite in the examples were herein minimized. This was achieved by exposing the starting parental zeolite—prior to the treatment- to the same drying conditions as the material obtained in Step C. Moreover, in all examples herein, the water content in the parent zeolite is at most 15%, and therefore has a minor influence on calculated MVE values. Moreover, examples including a direct comparison between the state of the art and the invention are executed using the same parental material, enabling the best possible comparison, independent of the water content of the parent zeolite.

$dV_{min}/dV_{meso}$ for Determining the Loss of Microporosity During Alkaline Treatment The loss of microporosity during any alkaline treatment aimed at mesopore formation can be suitably monitored by normalization of the change in microporosity ($dV_{micro}$) to the change in mesopore volume ($dV_{meso}$) of the treated zeolite with respect to the starting untreated zeolite. In many cases, though certainly not all, the resulting $dV_{micro}/dV_{meso}$ ratio will be negative based on the general reduction in micropore volume and increase in mesopore volume upon alkaline treatment. In such cases, it is preferred that the value be a small as possible as this implies that the loss of microporosity per unit volume of mesoporosity created was small. In such cases, it is also preferred that this value is in between 0 and −1, as this implies that more mesopore volume was created than micropore volume was lost.

X-Ray Diffraction (XRD) for Examining the Preservation of Intrinsic Properties and Unit Cell Size The preservation of the intrinsic properties and the unit cell size can be examined using X-ray diffraction (XRD). This technique results in a topology-specific reflection pattern. The relative crystallinity, indicative for the overall intrinsic zeotypical properties, can be assessed by integration of several characteristic peaks using methods such as described in ASTM D3906. It is preferred that the mesoporous treated sample displays a crystallinity as high as possible relative to the starting crystalline inorganic solid. X-ray diffraction is also a useful characterization technique as it enables to determine the unit cell size, expressed in Angstrom. Particularly in the case of faujasites, the unit cell size is relevant as it gives an indication of the composition (atomic Si/Al ratio) of the framework. The unit cell size as used herein derived using established methods as specified in ASTM 3942.

Treated Materials: Solid Yield and Metal Content

The resulting mesoporous zeolites are preferably obtained at a wide ranges of solid yields ranging preferably from about 10, 15, 20, 25 or 30 to about 100, 125, 150, 175 or 200% relative to the weight of the to be treated zeolite, more preferably from about 20, 30, 40 or 50 to about 100, 110, 120, 130, 140 or 150% and most preferred from about 55, 60 or 65 to about 105, 110 or 115% yield. In the case metal salts (such as those mentioned in Table 1) are used, the treated solid may contain substantial amounts of metals. The metal content can vary widely, preferably from about 0.001 wt % to about 30, 40, 50, 60, 70 or 80 wt %, more preferably from about 0.05, 0.1, 0.2 or 0.3 wt % to about 35, 30 or 35 wt % and most preferably from about 0.5, 1 or 1.5 wt % to about 9, 10 or 11 wt %. Preferred metals are those that besides cost, safety, and synthetic advantages, also have demonstrated catalytic potential in (bifunctional) catalysis, such as iron, nickel, molybdenum, magnesium, cobalt, copper, zinc, tin, and titanium. The composition of the samples can be measured with routine elemental analysis using established techniques, such as Inductively-coupled plasma optical emission spectroscopy (ICP OES) and/or X-ray fluorescence (XRF).

Treated Materials: Micro, Mesoporosity and MVE

The porosity of the treated materials varies widely and may depend strongly on the nature of the to be treated zeolite. For example, the microporosity of different conventional (untreated) zeolites differs strongly, going from a ZSM-22 zeolite ($V_{micro}$ of about 0.06 to about 0.08 ml $g^{-1}$) to a faujasite ($V_{micro}$ of about 0.25 to about 0.33 ml $g^{-1}$). In addition, the properties of the resulting solids can depend strongly on the applied treatment conditions, most relevant being the amount of salt added in Step A and the amount of base added in Step B. The resulting materials display preferably at least about 45, 50 or 55% of the microporosity compared to the to be treated parent zeolite, more preferably at least about 60, 65 or 70%, and most preferentially at least 75, 80 or 85%. Preferred mesopore volumes are at least about 0.10, 0.15 or 0.20 ml $g^{-1}$, more preferably at least 0.25 or 0.30 ml $g^{-1}$ and most preferably above 0.33, 0.34 or 0.35 ml $g^{-1}$. Preferred mesopore surfaces are at least about 30, 40 or 50 $m^2$ $g^{-1}$, more preferably at least 80, 90 or 100 $m^2$ $g^{-1}$, and most preferably above 140, 145 or 150 $m^2$ $g^{-1}$ Preferred total surfaces ($S_{BET}$) are at least 65, 70 or 75% compared to the to be treated parent zeolite, more preferably at least 80, 85 or 90% and most preferably at least 95, 100 or 105%. Preferred MVE values are preferably at least 2, 3, 4 or 5 ul $g^{-1}$ $\%^{-1}$, more preferably at least 8, 9 or 10 ul $g^{-1}$ $\%^{-1}$ and most preferably at least 12, 12.5 or 13 ul $g^{-1}$ $\%^{-1}$. For treated samples prone to amorphization during mesopore formation by alkaline treatment, such as USY, Y, and beta zeolites, preferred $dV_{micro}/dV_{meso}$ values are preferably in the range of about 0.0, −0.1 or −0.2 to about −0.9, −1.0 or −1.1, more preferably in the range of about 0.0, −0.05 or −0.1 to about −0.4, −0.45, −0.5, −0.55 or −0.60 and most preferably in the range of about 0.0, −0.05 or −0.1 to about −0.25, −0.3 or −0.35.

Treated materials: Acidity

Acidity measurements are instrumental as they enable to monitor the amount and type of acid sites present in the zeolite. Two established techniques are used herein: infrared spectroscopy of the zeolites with pyridine adsorbed and temperature programmed desorption of ammonia ($NH_3$-TPD). Acidity assessment using pyridine-probed infrared spectroscopy was executed as was reported previously in WO2017148852, resulting in a concentration of Brønsted sites (B) and Lewis sites (L), both in μmol per gram, which can be combined to give an overall acidity (B+L) and a relatively Lewis acidity, L/(B+L).

$NH_3$-TPD was performed using was conducted following an established protocol disclosed in US20190375724. Herein a key important parameter is the saturation and removal of excess $NH_3$ is performed at 100° C. (step 2 and 3 in US20190375724). The resulting profile is integrated to yield an overall acidity (referred to as '$NH_3$'), which, after due calibration, can be expressed in μmol per gram.

Treated Materials: Metal Dispersion

The dispersion of noble-metal containing zeolites was executed with routine CO chemisorption. This was achieved using an infrared spectroscopy apparatus equipped with a glass cell and an oven. After thermal treatment of the sample a reference spectra is recorded at 25° C., a calibrated volume of CO is then dosed by increment and infrared spectra are recorded after each increment. Prior to the dosing of CO, the samples are reduced in hydrogen at 300° C. for 1 h. The exact protocol followed is as described in Catalysis Letters, 18, 193-208, 1993. The resulting signal can be normalized to the metal content, yielding an indication of the accessible metal species, that is, the dispersion.

Treated Unique Materials

A further embodiment of the current invention relates to a faujasite zeolite with unit cell size smaller than 24.38 A, obtainable by the process for increasing mesoporosity in zeolites, and comprising: a $V_{meso}$ exceeding 0.40 ml $g^{-1}$, a $V_{micro}$ exceeding 0.15 ml $g^{-1}$ and a magnesium content of minimum 0.1 wt % and maximum 20 wt % is disclosed.

Several embodiments of the invention regard unique materials. A first unique material regards a faujasite with a unit cell size preferably below about 24.46, 24.45 or 24.44 Angstrom, more preferably below about 24.39, 24.38 or 24.37 Angstrom and most preferably below about 24.34, 24.33 or 24.32 Angstrom. This first material features a $V_{meso}$ of preferably at least about 0.25, 0.30 or 0.35 ml $g^{-1}$, preferably at least about 0.39, 0.40 or 0.42 ml $g^{-1}$, and most preferably at least about 0.49, 0.50 or 0.51 ml $g^{-1}$. This first material features a $V_{micro}$ of preferably at least about 0.05, 0.075, 0.10 or 0.125 ml $g^{-1}$, more preferably at least 0.14, 0.15 or 0.16 ml $g^{-1}$ and most preferably at least 0.19, 0.20 or 0.21 ml $g^{-1}$. This first material features magnesium content preferably in the range of about 0.005, 0.01, 0.02, 0.03, 0.05, 0.1, 0.2, 0.5, 1, 2, 5 or 10 wt % to about 30, 35, 40, 45 or 50 wt %, more preferably in the range of 0.05, 0.1 or 0.15 wt % to about 15, 20 or 25 wt % and most preferably in the range of about 0.9, 1 or 1.1 wt % to about 9, 10 or 11 wt %.

A next embodiment of the current invention relates to a ZSM-23 zeolite obtainable by the process for increasing mesoporosity in zeolites and comprising: a $V_{meso}$ exceeding 0.55 ml $g^{-1}$ and a $V_{micro}$ exceeding 0.06 ml $g^{-1}$ is disclosed.

A second unique material regards a ZSM-23 zeolite (MTT topology). This second material features a $V_{meso}$ preferably of at least about 0.44, 0.45 or 0.46 ml $g^{-1}$, more preferably at least about 0.54, 0.55 or 0.56 ml $g^{-1}$ and most preferably at least about 0.64, 0.65 or 0.66 ml $g^{-1}$. This second material features a $V_{micro}$ preferably of at least about 0.035, 0.04 or 0.045 ml $g^{-1}$, more preferably at least about 0.055, 0.06 or 0.065 ml $g^{-1}$ and most preferably at least about 0.07, 0.075 or 0.08 ml $g^{-1}$.

A following embodiment of the current invention relates to a SSZ-13 zeolite obtainable by the process for increasing mesoporosity in zeolites and comprising: a $V_{meso}$ exceeding 0.15 ml $g^{-1}$, a $V_{micro}$ exceeding 0.18 ml $g^{-1}$ and an atomic Si/Al ratio of maximum 10 mol $mol^{-1}$ is disclosed.

A third unique material regards a SSZ-13 zeolite (CHA topology). This third material features a $V_{meso}$ preferably of at least about 0.09, 0.10 or 0.11 ml $g^{-1}$, more preferably at least about 0.14, 0.15 or 0.16 ml $g^{-1}$ and most preferably at least about 0.24, 0.25 or 0.26 ml $g^{-1}$. This third material features a $V_{micro}$ preferably of at least about 0.13, 0.14 or 0.15 ml $g^{-1}$, more preferably at least 0.17, 0.18 or 0.19 ml $g^{-1}$ and most preferably at least 0.20, 0.21 or 0.22 ml $g^{-1}$. This third material features a bulk Si/Al ratio preferably of at most about 11, 12 or 13 mol $mol^{-1}$, more preferably at most about 9 or 10 mol $mol^{-1}$ and most preferably of at most about 7.5, 8 or 8.5 mol $mol^{-1}$.

A fourth unique material regards a zeolite with the MFI topology, an atomic Si/Al ratio of at least 60, a $V_{micro,0.01}$ of at least 0.10 ml $g^{-1}$, a $V_{meso,0.2\text{-}1}$ of at least 0.30 ml $g^{-1}$, and a Lewis acidity (L) as measured with pyridine of at least 100 μmol $g^{-1}$.

In a specific embodiment, said zeolite with MFI topology may accordingly be characterized by one or more of the following features:

An atomic Si/Al ratio of about and between 60-3000; such as about and between 60-2000, about and between 60-1000; about and between 60-500;

a $V_{micro,0.01}$ of about and between 0.10 ml $g^{-1}$-0.18 ml $g^{-1}$, such as about and between 0.11 ml $g^{-1}$-0.15 ml $g^{-1}$; about and between 0.12 ml $g^{-1}$-0.15 ml $g^{-1}$ a $V_{meso,0.2\text{-}1}$ of about and between 0.30 ml $g^{-1}$-1.20 ml $g^{-1}$; such as about and between 0.40 ml $g^{-1}$-1.00 ml $g^{-1}$; about and between 0.50 ml $g^{-1}$-0.80 ml $g^{-1}$ a Lewis acidity (L) as measured with pyridine of about and between 100 μmol $g^{-1}$-350 μmol $g^{-1}$; such as about and between 100 μmol $g^{-1}$-300 μmol $g^{-1}$; about and between 100 μmol $g^{-1}$-250 μmol $g^{-1}$ This fourth material can also consist of the following features:

a metal content of at least 0.3 wt %, wherein the metal is Mg, Ni, Cu, Fe, Zn, or Co;

a L/(B+L) ratio of at least 0.85; and/or an overall acidity (B+L) of at least 125 μmol/g.

In a specific embodiment, the fourth material may accordingly be characterized by one or more of the following features:

a metal content of about and between 0.3 wt %-25 wt %; such as about and between 0.3 wt %-20 wt %; about and between 0.3 wt % to 15 wt %; about and between 0.3 wt %-10 wt %;

a L/(B+L) ratio of about and between 0.85-1.00; such as about and between 0.85-0.95; about and between 0.90-0.95;

an overall acidity (B+L) of about and between 125 μmol/g-500 μmol/g; such as about and between 125 μmol/g-400 μmol/g; about and between 125 μmol/g-350 μmol/g; about and between 125 μmol/g-300 μmol/g.

A fifth unique materials regards a zeolite with the FAU topology, an atomic Si/Al ratio of at least 3.5, a $V_{micro}$ of at least 0.18 ml $g^{-1}$, a $V_{meso}$ of at least 0.30 ml $g^{-1}$, and a Lewis acidity (L) as measured with pyridine of at least 250 μmol/g.

In a specific embodiment, said zeolite with FAU topology may accordingly be characterized by one or more of the following features:

An atomic Si/Al ratio of about and between 3.5-100; such as about and between 3.5-50, about and between 3.5-20; about and between 3.5-10;

a $V_{micro}$ of about and between 0.18 ml $g^{-1}$-0.30 ml $g^{-1}$, such as about and between 0.18 ml $g^{-1}$-0.25 ml $g^{-1}$; about and between 0.18 ml $g^{-1}$-0.23 ml $g^{-1}$ a $V_{meso}$ of about and between 0.30 ml $g^{-1}$-1.20 ml $g^{-1}$; such as about and between 0.40 ml $g^{-1}$-1.00 ml $g^{-1}$; about and between 0.50 ml $g^{-1}$-0.80 ml $g^{-1}$ a Lewis acidity (L) as measured with pyridine of about and between 250 μmol $g^{-1}$-500 μmol $g^{-1}$; such as about and between 250 μmol $g^{-1}$-450 μmol $g^{-1}$; about and between 250 μmol $g^{-1}$-400 μmol $g^{-1}$ This fifth material can also consist of the following features:

a metal content of at least 0.3 wt %, wherein the metal is Mg, Ni, Cu, Fe, Mo, or Co;

a L/(B+L) molar ratio of at least 0.40; and/or an overall acidity (B+L) of at least 600 μmol/g.

In a specific embodiment, the fifth material may accordingly be characterized by one or more of the following features:

a metal content of about and between 0.3 wt %-25 wt %; such as about and between 0.3 wt %-20 wt %; about and between 0.3 wt % to 15 wt %; about and between 0.3 wt %-10 wt %;

a L/(B+L) ratio of about and between 0.40-1.00; such as about and between 0.40-0.90; about and between 0.40-0.60;

an overall acidity (B+L) of about and between 600 μmol/g-800 μmol/g; such as about and between 600 μmol/g-750 μmol/g; about and between 600 μmol/g-700 μmol/g.

EXAMPLES

Several (comparative) examples illustrate the process and resulting materials of the invention.

Two types of treatment procedures are described: a preferred base leaching process (Process A, in FIG. 1, Example 1) and a base leaching process used in the prior art (Process B, FIG. 1, Example 2). Within the examples, the term 'salt' refers to the additive used and not to the base used to increase the pH or the acid in any subsequent acid treatment. In the examples, the degree of hydration of the salt is not mentioned, as the mentioned salt amounts are based on molarities instead of weight, and the degree of hydration of the salt is assumed to have a negligible influence.

Examples 1-12, 45-54: High SAR USY

In Examples 1-12 and 45-54 the embodiments of the invention are illustrated on a parent USY with an atomic Si/Al=15 mol $mol^{-1}$ and unit cell size 24.28 Angstrom (a high SAR USY 'CBV 720' provided by Zeolyst).

Example 1: 2.5 mmol of magnesium nitrate (salt) was added in one go to 45 ml of water, which was stirred and maintained at 65° C. in a round-bottom flask. Next, within several minutes, 1.65 g of the zeolite was added to the solution, stirred, and maintained at 65° C. for about 5 minutes (forming the suspension of Step A). Then, in Step B, 5 ml of a 2 M NaOH solution was added dropwise to the suspension of Step A over the course of 30 min. Afterwards, in Step C, the suspension was transferred to a Buchner filtration set-up equipped with a cellulose filter (Whatman filter, #5, 90 mm id), in order to separate the solid from the suspension. Afterwards, the resulting wet zeolite was dried overnight in an oven at 100° C.

Next, the dried solid was exposed to a subsequent acid treatment. Hereto, 1 g of the dried solid obtained after Step C was introduced in one go in a round-bottom flask containing a stirred 100 ml solution of a 0.1 M HCl (10 mmol HCl per gram of zeolite). The resulting suspension was stirred and maintained at 95° C. for 6 h. Afterwards, the solid was separated using the above-described Buchner filtration, dried, and analysed using nitrogen sorption.

Example 2: 10.0 mmol of NaOH was added in one go to 50 ml of water, which was stirred and maintained at 65° C. in a round-bottom flask. Next, within several minutes, 2.5 mmol of magnesium nitrate (salt) was added in one go (forming the suspension described in Step 1). Next, several minutes later in Step 2, 1.65 g of zeolite was added in one go, stirred, and maintained at 65° C. in a round-bottom flask for about 30 minutes. Afterwards, the same separation (Step C), drying, acid treatment, and nitrogen analysis were applied as described in Example 1.

In Examples 3-12, the same approach as in Example 1 (Process A) or Example 2 (Process B) was used, with the exception that the nature of the salt or process was varied. In addition, in CE4 (using $Al(NO_3)_3$ as salt), the concentration of salt was 0.5 mmol instead of 2.5 mmol. An overview of the used process, salt, and resulting yields and properties is provided in Table 2.

TABLE 2

Properties of parent high SAR USY zeolite and conditions and properties of derived base-treated USY zeolites.

| Example # | Process | Salt type | Yield/% | $V_{meso}$/ ml $g^{-1}$ | $S_{BET}$/ $m^2$ $g^{-1}$ | $S_{meso}$/ $m^2$ $g^{-1}$ | $V_{micro}$/ ml $g^{-1}$ | MVE/ μl $g^{-1}$ $\%^{-1}$ | $dV_{micro}$/ $dV_{meso}$/— |
|---|---|---|---|---|---|---|---|---|---|
| Parent | — | — | — | 0.26 | 671 | 210 | 0.27 | — | — |
| E1 | A | $Mg(NO_3)_2$ | 81 | 0.54 | 683 | 391 | 0.17 | 15 | −0.4 |
| E2 | B | $Mg(NO_3)_2$ | 80 | 0.60 | 583 | 559 | 0.01 | 17 | −0.8 |
| CE3 | A | — | 54 | 0.44 | 553 | 533 | 0.01 | 4 | −1.4 |
| CE4 | A | $Al(NO_3)_3$ | 71 | 0.39 | 511 | 410 | 0.07 | 4 | −1.5 |
| CE5 | A | TPABr | 66 | 0.46 | 665 | 308 | 0.21 | 6 | −0.3 |
| CE6 | A | NaCl | 48 | 0.48 | 528 | 531 | 0.00 | 4 | −1.2 |
| E7 | A | $Cu(NO_3)_2$ | 79 | 0.45 | 650 | 345 | 0.18 | 9 | −0.5 |
| E8 | A | $Fe(NO_3)_3$ | 84 | 0.48 | 681 | 385 | 0.17 | 14 | −0.5 |
| E9 | A | $Zn(NO_3)_2$ | 84 | 0.33 | 633 | 185 | 0.26 | 4 | −0.2 |
| E10 | A | $(NH_4)_6Mo_7O_{24}$ | 85 | 0.33 | 743 | 294 | 0.26 | 5 | −0.1 |
| E11 | B | $Fe(NO_3)_3$ | 86 | 0.46 | 595 | 458 | 0.08 | 14 | −1.0 |
| E12 | B | $Zn(NO_3)_2$ | 80 | 0.53 | 573 | 251 | 0.18 | 14 | −0.3 |

The results show that in the absence of any additive salt (CE3), Process A yields some mesopore formation. However, the latter is combined with a complete loss of the micropore volume, indicating a complete loss of the zeolite structure. Addition of inorganic unsuitable salts (NaCl or $Al(NO_3)_3$) do not prevent the amorphization of the major part of the zeolite structure (CE4 and CE6). When, on the other hand, suitable salts are used in Process A (E1, E7-E10), similar and higher degrees of mesopore volume are attained, whereas the micropore volume was also largely preserved. The obtained porosities are similar to the example where TPABr was used (CE5). The ability to achieve such porosity in the complete absence of organics is of large industrial value. Accordingly, the $dV_{micro}/dV_{meso}$ was roughly similar (E1, E7, E8) or even smaller (E9, E10) compared to that of the example where TPABr was included as salt (CE5). Finally, not only does the invention enable to achieve preferred porosity profiles, also the mesopore volume efficiency (MVE) was in some cases more than double (E1+E8) that of comparative examples (CE5), implying that less material needs to be dissolved in order to achieve a preferred porosity profile. When Process B is used the suitable salts are effective in the cost-effective introduction of mesopore volume with high MVEs.

In Examples 45-54, the same approach as in Example 1 was applied, with the exception that the nature of the salt, base, and acid (for the subsequent acid treatment) was varied. An overview of the conditions and the resulting properties is provided in Table 7. In order to provide a more comprehensive overview, the effect of the treatments was indicated in ranges from very good (++) to good (+), to moderate (+/−), to poor (−), and to very poor (−−). The values for these ranges are given in Table 8.

The results summarized in Table 7, lead to the same conclusions as Table 2: the state of the art leaching in the absence of salts (CE45) leads to a pronounced loss of microporosity, which can be overcome by using organic additives (CE46). Again, the inventive inorganic additives (E47-E54), enable to preserve the micropore structure, boost the mesopore formation, yield very high mesopore volume efficiencies, without the need for costly organics. Moreover, the data in Table 7 demonstrates that a wide variety of bases, acids (for the subsequent acid treatment), and anions in the salt can be used in the process.

Examples 13-22: Y

In Examples 13-22 the embodiments of the invention are illustrated on a parent Y with an atomic Si/Al=2.6 mol $mol^{-1}$ and unit cell size 24.65 Angstrom (CBV 100 from Zeolyst). This zeolite was first acid treated, according to the acid treatment described in Example 1, with the exception that citric acid was used instead of HCl, the volume was 150 ml, and amount of zeolite was 10 g.

After separation and drying, several different base treatments were executed on the acid-treated zeolite using the same approach as in Example 1 (Process A) or Example 2 (Process B), with the exception that the nature of the salt or process was varied and the acid treatment following the base treatment was not executed. In addition, in CE14 (using $Al(NO_3)_3$ as salt), the concentration of salt was 0.5 mmol instead of 2.5 mmol. An overview of the used process, salt, and resulting yields and properties is provided in Table 3.

TABLE 3

Properties of parent Y zeolite and conditions and properties of derived base-treated Y zeolites.

| Example # | Process | Salt type | Yield/% | $V_{meso}$/ ml $g^{-1}$ | $S_{BET}$/ $m^2$ $g^{-1}$ | $S_{meso}$/ $m^2$ $g^{-1}$ | $V_{micro}$/ ml $g^{-1}$ | MVE/ μl $g^{-1}$ $\%^{-1}$ |
|---|---|---|---|---|---|---|---|---|
| Parent | — | — | — | 0.02 | 688 | 23 | 0.34 | — |
| CE13 | A | — | 48 | 0.15 | 614 | 134 | 0.25 | 3 |
| CE14 | A | $Al(NO_3)_3$ | 59 | 0.23 | 540 | 155 | 0.20 | 5 |
| CE15 | A | TPABr | 49 | 0.17 | 611 | 172 | 0.22 | 3 |
| CE16 | A | NaCl | 48 | 0.09 | 583 | 73 | 0.26 | 1 |
| E17 | A | $Mg(NO_3)_2$ | 64 | 0.24 | 592 | 187 | 0.21 | 6 |
| E18 | A | $Co(NO_3)_2$ | 70 | 0.38 | 534 | 193 | 0.18 | 12 |

TABLE 3-continued

Properties of parent Y zeolite and conditions and properties of derived base-treated Y zeolites.

| Example # | Process | Salt type | Yield/% | $V_{meso}$/ ml $g^{-1}$ | $S_{BET}$/ $m^2$ $g^{-1}$ | $S_{meso}$/ $m^2$ $g^{-1}$ | $V_{micro}$/ ml $g^{-1}$ | MVE/ μl $g^{-1}$ $\%^{-1}$ |
|---|---|---|---|---|---|---|---|---|
| E19 | A | $Cu(NO_3)_2$ | 76 | 0.12 | 436 | 125 | 0.16 | 4 |
| E20 | A | $Fe(NO_3)_3$ | 74 | 0.21 | 531 | 212 | 0.16 | 7 |
| E21 | B | $Mg(NO_3)_2$ | 63 | 0.52 | 603 | 269 | 0.17 | 14 |
| E22 | B | $Co(NO_3)_2$ | 65 | 0.48 | 610 | 272 | 0.17 | 13 |

The results show that in the absence of any additive salt (CE13), Process A yields a micropore volume that is preserved to about two-thirds, and that the mesopore volume is limited to about 0.15 ml $g^{-1}$. Addition of unsuitable salts (CE14-CE16) do not influence the creation of mesopore volume very positively. When, on the other hand, suitable salts are used (E17-E20), the mesopore volume doubled after treatment, resulting also in much larger MVE values.

These examples illustrate that the invention enables to substantially improve the cost-effective preparation of a mesoporous Y zeolite, combining significant mesoporosity with high solid yields.

Examples 23-28: ZSM-22

In Examples 23-28 the embodiments of the invention are illustrated on a parent ZSM-22 with an atomic Si/Al of about 40 mol $mol^{-1}$. Several base treatments were executed using the same approach as in Example 1 (Process A), with the exception that the amount of base and the nature and amount of the salt was varied, and the base treatment (Step B) lasted 60 min instead of 30 min. An overview of the used base amounts, salt types and amounts, and resulting yields and properties is provided in Table 4.

TABLE 4

Properties of parent ZSM-22 zeolite and conditions and properties of derived base-treated ZSM-22 zeolites using Process A.

| Example # | salt type | NaOH/M | Salt/M | Yield/% | $V_{meso}$/ ml $g^{-1}$ | $S_{BET}$/ $m^2$ $g^{-1}$ | $S_{meso}$/ $m^2$ $g^{-1}$ | $V_{micro}$/ ml $g^{-1}$ | MVE/ μl $g^{-1}$ $\%^{-1}$ |
|---|---|---|---|---|---|---|---|---|---|
| Parent | — | — | — | — | 0.20 | 198 | 45 | 0.08 | — |
| CE23 | — | 0.6 | — | 48 | 0.22 | 253 | 80 | 0.09 | 0 |
| CE24 | NaCl | 0.4 | 1 | 56 | 0.22 | 254 | 86 | 0.09 | 0 |
| CE25 | $Al(NO_3)_3$ | 0.4 | 0.01 | 85 | 0.16 | 214 | 76 | 0.07 | −3 |
| CE26 | TPABr | 0.4 | 0.1 | 62 | 0.22 | 197 | 71 | 0.06 | 0 |
| E27 | $Mg(NO_3)_2$ | 0.4 | 0.1 | 72 | 0.49 | 286 | 135 | 0.08 | 10 |
| E28 | $Ca(NO_3)_2$ | 0.6 | 0.1 | 75 | 0.52 | 369 | 266 | 0.05 | 13 |

The results show that in the absence of any additive salt (CE23) the micropore volume is preserved, but that no significant mesopore volume is created. Addition of unsuitable salts (CE24-CE26) do not influence the creation of mesopore volume positively. When, on the other hand, suitable salts are used (E27, E28), the mesopore volume doubled after treatment, resulting also in a large MVE. These examples illustrate that the invention is enabling in attaining a mesoporous ZSM-22 zeolite with significant mesoporosity at high solid yields.

Examples 29-40, 44: ZSM-23

In Examples 29-40 the embodiments of the invention are illustrated on a parent ZSM-23 with an atomic Si/Al of about 50 mol $mol^{-1}$. Several base treatments were executed using the same approach as in Example 1 (Process A) or Comparative Example 2 (Process B), with the exception that the amount of base, the nature and amount of the salt, and the time and temperature of the base treatment (Step B or Step 2) was varied. In the case of E44, NaOH was substituted for an equimolar amount of KOH. An overview of the used base amounts, base treatment time and temperature, salt types and amounts, and resulting yields and properties is provided in Table 5.

The results show that in the absence of any additive salt (CE29) base leaching using Process A leads to a preserved micropore volume, and that some degree of mesopore volume is created. Addition of unsuitable salts (CE30-CE32) do not influence the creation of mesopore volume positively as roughly similar MVE values are obtained. When, on the other hand, suitable salts are used (E33-E38), the mesopore volume creating takes place much more efficient, resulting in much higher MVE values. These examples illustrate that the invention is enabling in attaining a mesoporous ZSM-23 zeolite with significant mesoporosity at high solid yields. Also when suitable salts are used in Process B (E39, E40) high MVEs can be attained.

Examples 41-43: High SAR ZSM-5

In Examples 41-43 the embodiments of the invention are illustrated on a parent high SAR ZSM-5 with an atomic Si/Al of 140 mol $mol^{-1}$ (CBV 28014). Several base treatments were executed using the same approach as in Example 1 (Process A), with the exception that the alkaline solution added in step B was 3 M instead of 2 M, and that for $Al(NO_3)_3$ 0.3 mmol was used instead of 2.5 mmol.

An overview of the resulting yields and properties is provided in Table 6. The results show that in the absence of any additive salt (CE41) base leaching using Process A some degrees of mesopore volume is created. Addition of an unsuitable salts (CE42) does not influence the creation of mesopore volume positively as a lower MVE is obtained. Moreover, the unsuitable salt leads to a substantial cavitation of the mesopore volume. In contrast, the suitable salt (E43) enables a more efficient mesopore formation and a much lower cavitation.

TABLE 5

Properties of parent ZSM-23 zeolite and conditions and properties of derived base-treated ZSM-23 zeolites.

| Example # | Process | salt type | Base/M | Salt (M) | Temp/ ° C. | Time/h | Yield/% | $V_{meso}$/ ml $g^{-1}$ | $S_{BET}$/ $m^2$ $g^{-1}$ | $S_{meso}$/ $m^2$ $g^{-1}$ | $V_{micro}$/ ml $g^{-1}$ | MVE/μl $g^{-1}$ $\%^{-1}$ |
|---|---|---|---|---|---|---|---|---|---|---|---|---|
| Parent | — | — | — | — | — | — | — | 0.37 | 244 | 89 | 0.08 | — |
| CE29 | A | — | 0.4 | — | 85 | 1 | 51 | 0.60 | 277 | 122 | 0.08 | 5 |
| CE30 | A | NaCl | 0.2 | 1 | 85 | 1 | 59 | 0.45 | 277 | 124 | 0.08 | 2 |
| CE31 | A | $Al(NO_3)_3$ | 0.2 | 0.01 | 85 | 1 | 82 | 0.48 | 282 | 121 | 0.08 | 6 |
| CE32 | A | TPABr | 0.2 | 0.05 | 85 | 1 | 57 | 0.52 | 291 | 137 | 0.08 | 3 |
| E33 | A | $Mg(NO_3)_2$ | 0.4 | 0.2 | 85 | 1 | 84 | 0.48 | 301 | 148 | 0.08 | 7 |
| E34 | A | $Ca(NO_3)_2$ | 0.5 | 0.05 | 65 | 0.5 | 88 | 0.56 | 252 | 172 | 0.05 | 16 |
| E35 | A | $Mn(NO_3)_2$ | 0.5 | 0.05 | 65 | 0.5 | 80 | 0.63 | 244 | 158 | 0.05 | 13 |
| E36 | A | $Ti(OiPr)_4$ | 0.5 | 0.05 | 65 | 0.5 | 85 | 0.51 | 275 | 163 | 0.07 | 9 |
| E37 | A | $Co(NO_3)_2$ | 0.5 | 0.05 | 65 | 0.5 | 64 | 0.84 | 283 | 189 | 0.07 | 13 |
| E38 | A | $Ni(NO_3)_2$ | 0.4 | 0.05 | 65 | 0.5 | 65 | 0.69 | 247 | 171 | 0.05 | 9 |
| E39 | B | $Mg(NO_3)_2$ | 0.4 | 0.2 | 65 | 0.5 | 90 | 0.47 | 283 | 173 | 0.06 | 15 |
| E40 | B | $Ca(NO_3)_2$ | 0.5 | 0.05 | 65 | 0.5 | 79 | 0.50 | 276 | 191 | 0.05 | 6 |
| E44 | A | $Mg(NO_3)_2$ | 0.5 | 0.05 | 65 | 0.5 | 62 | 0.59 | 273 | 149 | 0.06 | 6 |

TABLE 6

Properties of parent and derived base-treated high SAR ZSM-5 zeolites using Process A.

| Example # | Salt type | Yield/% | $V_{meso,\ 0.2\text{-}1}$/ ml $g^{-1}$[a] | $S_{BET}$/ $m^2$ $g^{-1}$ | MVE μl $g^{-1}$ $\%^{-1}$ | Cavitation/% |
|---|---|---|---|---|---|---|
| Parent | — | — | 0.03 | 330 | — | 15 |
| CE41 | — | 62 | 0.19 | 404 | 4 | 11 |
| CE42 | $Al(NO_3)_3$ | 77 | 0.10 | 402 | 3 | 51 |
| E43 | $Mg(NO_3)_2$ | 70 | 0.19 | 419 | 5 | 13 |

[a]Based on limitation of t-plot on high silica MFI zeolites, the mesopore volume was determined by taking the volume adsorbed from in the p/p0 range of 0.2-1.

TABLE 7

The effectivity of different bases, salts, and acids as part of state of the art and inventive base treatments on a high SAR USY using Process A.

| Sample | Salt | Base | Acid | $V_{meso}$ | $S_{BET}$ | $S_{meso}$ | $V_{micro}$ | MVE | $dV_{micro}$/ $dV_{meso}$ |
|---|---|---|---|---|---|---|---|---|---|
| Parent | na | na | na | − | ++ | − | ++ | na | na |
| CE45 | none | NaOH | HCl | + | − | ++ | −− | −− | −− |
| CE46 | TPABr | NaOH | HCl | + | ++ | + | ++ | −− | ++ |
| E47 | $Mg(NO_3)_2$ | LiOH | HCl | + | ++ | + | + | ++ | + |
| E48 | $Mg(NO_3)_2$ | $Na_2CO_3$ | HCl | +/− | ++ | +/− | ++ | − | + |
| E49 | $Mg(NO_3)_2$ | $(NH_4)_2CO_3$ | HCl | − | ++ | − | ++ | −− | + |
| E50 | $MgCO_3$ | NaOH | HCl | +/− | ++ | + | + | − | − |
| E51 | Mg(Acetate) | NaOH | HCl | + | ++ | + | + | + | + |
| E52 | $CuCl_2$ | NaOH | $Na_2H_2EDTA$ | + | + | ++ | − | ++ | +/− |
| E53 | $MgHPO_4$ | NaOH | $NaH_2Citrate$ | +/− | ++ | +/− | ++ | +/− | + |
| E54 | $FeSO_4$ | NaOH | $HNO_3$ | + | ++ | + | + | − | + |

TABLE 8

Ranges for the values indicated in Table 7.

| Range | $V_{meso}$ ml $g^{-1}$ | $S_{BET}$ $m^2$ $g^{-1}$ | $S_{meso}$ $m^2$ $g^{-1}$ | $V_{micro}$ ml $g^{-1}$ | MVE μl $g^{-1}$ $\%^{-1}$ | $dV_{micro}$/ $dV_{meso}$/— |
|---|---|---|---|---|---|---|
| ++ | ≥0.51 | ≥651 | ≥401 | ≥0.22 | ≥10 | −0.15 to 0.00 |
| + | 0.41-0.50 | 601-650 | 351-400 | 0.17 to 0.21 | 8 and 9 | −0.39 to −0.14 |
| +/− | 0.31-0.40 | 551-600 | 276-350 | 0.13 to 0.16 | 6 and 7 | −0.69 to −0.40 |
| − | 0.21-0.30 | 501-550 | 201-275 | 0.09 to 0.12 | 4 and 5 | −0.99 to −0.70 |
| −− | ≤0.20 | ≤500 | ≤200 | ≤0.08 | ≤3 | ≤−1.00 |

Examples 55-65: Applicability to Different Zeolites and Zeolite-Like Materials

In Examples 55-65 the embodiments of the invention are illustrated on a variety of zeolites and zeolite-like materials, such as SAPOs (compositions of the parents summarized in Table 9). In all cases, the base treatments were executed using the same approach as in Example 1 (Process A), with the exception that the nature of the base and the subsequent acid treatment was varied. Also in some cases, a subsequent acid treatment was not executed. The details of the treatments and resulting materials are summarized in Table 9. In the case a different salt concentration than 0.05 M was used, this is mentioned explicitly in brackets in Table 9. Several other specific adjustments were made specific to examples on the specific zeolites: For SAPO-34 and SAPO-11 a standard calcination treatment in air was executed after the base treatment at 550° C. for 5 h, ramp rate 5° C. $min^{-1}$. For zeolites L and SSZ-13, prior to the base treatment an acid treatment was executed, similar to that in Examples 13-22, with the exception that HCl was used instead of citric acid, and that in the case of SSZ-13, the acid concentration was 10 times higher, and it was executed in a gradual fashion, that is, the amount of acid was added drop by drop during the entire length of treatment.

The results in Table 9 demonstrate that in all cases, the inventive use of the salt enables to achieve substantial benefits over standard base treatment, in the sense of mesopore volume, mesopore surface, yield, and mesopore volume efficiency. These positive results are obtained seemingly independent of the nature of the parental zeolite or zeolite-like materials. In addition, the table demonstrates that the inventive effect can be achieved using a variety of types of salts (cation and anion), bases, and acids.

Another benefit of the invention was highlighted by examples 61 and 62, regarding the nano-sized ZSM-5 crystals. In this case standard base treatment (CE61), a suspension was obtained which could not be filtered using the standard cellulose filter media and resulted in a milky filtrate and a solid yield of 0%, potentially because of the fragmentation of the zeolite particles into much smaller particles or crystals. The use of an inventive salt (E62) enabled a facile filtration with a clear filtrate and a yield of 85%, which was combined with a strongly boosted mesoporosity.

TABLE 9

Comparison of state of the art and inventive base leaching for different zeolites and zeolite-like materials using Process A.

| Sample | Zeolite | $Si_x$/ $Al_y$/ $P_zO_2$/molar x/y/z | Salt/ (M) | Base | Acid | Yield/% | $V_{meso}$/ ml $g^{-1}$ | $S_{meso}$/ $m^2$ $g^{-1}$ | MVE/μl $g^{-1}$ $\%^{-1}$ |
|---|---|---|---|---|---|---|---|---|---|
| Parent | SAPO-34 | 0.09/0.41/0.41 | — | — | — | — | 0.03 | <2 | — |
| CE55 | SAPO-34 | — | none | TEAOH | none | 74 | 0.13 | 26 | 4 |
| E56 | SAPO-34 | — | Mg(Acetate) (0.025) | TEAOH | none | 60 | 0.25 | 99 | 6 |
| Parent | SAPO-11 | 0.08/0.41/0.41 | — | — | — | — | 0.37 | 90 | — |
| CE57 | SAPO-11 | — | none | TEAOH | none | 63 | 0.40 | 84 | 1 |
| E58 | SAPO-11 | — | Mg(Acetate) | TEAOH | none | 99 | 0.57 | 109 | >>10 |
| Parent | L | 0.75/0.25/0.00 | — | — | — | — | 0.05 | 37 | — |
| CE59 | L | — | none | NaOH | $Na_3$Citrate | 83 | 0.10 | 53 | 3 |
| E60 | L | — | $Mg(NO_3)_2$ | NaOH | $Na_3$Citrate | 98 | 0.22 | 83 | >>10 |
| Parent | Nano ZSM-5 | 0.97/0.03/0.00 | — | — | — | — | 0.07 | 66 | — |
| CE61 | Nano ZSM-5 | — | none | NaOH | none | 0 | — | — | — |
| E62 | Nano ZSM-5 | — | $Ca(NO_3)_2$ (0.01) | NaOH | none | 85 | 0.19 | 85 | 8 |
| Parent | EU-2 | 0.99/0.01/0.00 | — | — | — | — | 0.08 | 53 | — |
| CE63 | EU-2 | — | none | NaOH | HCl | 73 | 0.17 | 146 | 3 |
| E64 | EU-2 | — | $Mg(NO_3)_2$ | NaOH | HCl | 68 | 0.25 | 269 | 5 |
| Parent | SSZ-13 | 0.87/0.13/0.00 | — | — | — | — | 0.06 | 51 | — |
| E65 | SSZ-13 | — | $Mg(NO_3)_2$ | NaOH | none | 96 | 0.13 | 70 | >>10 |

Examples 66-70: Acidity and Composition of High SAR ZSM-5

The embodiments of the invention are illustrated by means of evaluation of the composition and acidity of a high SAR parent ZSM-5 with atomic Si/Al=140, and those treated using state of the art and inventive technologies. Two mesoporous zeolites were synthesized with a similar mesopore volume (Table 10). The syntheses were carried similar to Example 1, with the exception that the zeolite content was doubled. In addition, for the state of the art example (CE66), the concentration of added base (Step B in Process A) was 4 M instead of 2 M and no salt was added. Finally, for the inventive example (E67), the concentration of added base was 14 M instead of 2 M, and the concentration of salt was 0.3 M instead of 0.05 M. The properties of the resulting materials display that the MVE of the inventive sample was substantially higher.

A state of the art metal-containing MFI zeolite was synthesized by ion exchanging several grams of the sample CE66 to the ammonium form via a standard ion exchange using 3 consecutive treatment in $NH_4Cl$ (10 g $L^{-1}$, 8 h, room temperature, 0.1 M), followed by filtration and drying at 120° C. overnight. Next, a batch of several grams of the resulting sample was impregnated according to the state of the methods: a magnesium nitrate solution (in volume to match 90% of the total pore volume and in concentration to yield 0.5 wt % of magnesium on the solid) was added dropwise to the zeolite powder over 10 min, and subsequently stirred in a crucible for 2 h. Afterwards, the sample was dried overnight at 120° C., and finally calcined under air at 550° C. for 5 h (ramp rate 5° C./min), yielding sample CE68.

An inventive sample (E69) was activated by exposing sample E67 to the same IE and calcination (but not the IWI impregnation) as described for CE68. Finally, another inventive sample (E70) was prepared using the sample approach as for E69, with the exception that the acid treatment in HCl (executed after the base treatment) was not performed.

Table 11 demonstrates that for all three mesoporous ZSM-5 samples derived from the parent, substantial amounts of metal (Mg) were incorporated and that the Lewis acidity has increased whereas the Brønsted acidity is reduced. The inventive samples E69 and E70 clearly stand out from the state art sample as they both feature a higher overall acidity and a higher Lewis acidity (L). Moreover E70 also displays a very high Lewis acidity relative to the total acidity (L/B+L). The increased acidity of E69 and E70 compared to the parent zeolite are confirmed by $NH_3$-TPD.

TABLE 10

Porosity of base-treated high SAR ZSM-5 samples using Process A.

| Sample | Yield/% | $V_{micro, 0.01}$/ ml $g^{-1}$ | $V_{meso, 0.2-1}$/ ml $g^{-1}$ | $S_{BET}$/ $m^2$ $g^{-1}$ | MVE/µl/ g/% |
|---|---|---|---|---|---|
| Parent | — | 0.15 | 0.02 | 364 | — |
| CE66 | 51 | 0.16 | 0.42 | 408 | 8 |
| E67 | 79 | 0.14 | 0.46 | 378 | 21 |

similar to Example 1, with the exception that the complementary acid treatment was executed with $Na_2H_2$EDTA instead of HCl, and that for the state of the art example (CE71), the concentration of added base (Step B in Process A) was 2.5 M instead of 2 M and no salt was added, and that for the inventive example (E71), the concentration of added base was 4 M instead of 2 M, and the concentration of salt was 0.1 M instead of 0.05 M. The properties of the resulting materials display that the MVE of the inventive sample is substantially higher. In addition, sample E72 displayed a much lower mesopore cavitation.

A state of the art metal containing mesoporous USY (CE73) was made by application of the same ion-exchange, impregnation, and calcination protocol as detailed for CE68. Similarly, an inventive sample (E74) was prepared by execution of the same ion exchange and calcination as detailed for CE68, but not executing the impregnation. The properties of the resulting materials, summarized in Table 13, confirm that substantial amount of metal (Mg) was incorporated in both mesoporous USY zeolites. The inventive sample E74 clearly stands out from CE73, based on a much higher Lewis acidity (L), a higher overall acidity (B+L), and a higher Lewis acidity relative to the total acidity (L/B+L). Hence, the examples on ZSM-5 and USY clearly demonstrated that the metal incorporated in the solids using the inventive technology strongly boost the Lewis acidity compared to the state of art.

The invention also enables a higher metal retention upon exposure to acidic media, such as typically occurs during ion exchange. For example, in CE83 a mesoporous USY was prepared according to CE73, with the exception that the targeted amount of Mg was 2 wt % and the obtained metal content was 1.52 wt %. After the impregnation, this sample was exposed to the standard ion exchange procedure described for CE68, resulting in a magnesium content of

TABLE 11

Properties of state of the art and inventive parent and metal-containing mesoporous high SAR ZSM-5 zeolites.

| Sample | $V_{micro, 0.01}$/ ml $g^{-1}$ | $V_{meso, 0.2-1}$/ ml $g^{-1}$ | B/µmol $g^{-1}$ | L/µmol $g^{-1}$ | B + L/µmol $g^{-1}$ | $NH_3$/µmol $g^{-1}$ | Si/Al/ mol $mol^{-1}$ | Me/ wt % | L/(B + L)/ mol $mol^{-1}$ |
|---|---|---|---|---|---|---|---|---|---|
| Parent | 0.14 | 0.06 | 29 | 14 | 43 | 75 | 168 | 0.01 | 0.33 |
| CE68 | 0.15 | 0.51 | 15 | 53 | 68 | na | 134 | 0.40 | 0.78 |
| E69 | 0.14 | 0.46 | 36 | 63 | 99 | 214 | 87 | 0.89 | 0.64 |
| E70 | 0.11 | 0.38 | 13 | 131 | 144 | 380 | 67 | 14.1 | 0.91 |

Examples 71-74, 83: Acidity and Composition of Low SAR USY

The embodiments of the invention are illustrated by means of evaluation of the composition and acidity of a parent low SAR USY (CBV 712 from Zeolyst), and those treated using state of the art and inventive technologies. Two mesoporous zeolites were synthesized with an enhanced mesopore volume (Table 12). The syntheses were carried 0.01 wt %, hence a mere 1% retention of the metal. Conversely, exposure of the solid from E72 (having a metal content of 3.71 wt % Mg) to the same ion exchange procedure yielded a material with 2.52 wt % of Mg (E74), retaining 68% of the metal on the solid. Hence, this proves that the inventive method yields metals that are deposited in a very distinct manner compared to standard impregnation-based technologies.

TABLE 12

Porosity of low SAR USY samples obtained using Process A.

| Sample | Yield/% | $V_{meso}$/ ml $g^{-1}$ | $S_{BET}$/ $m^2$ $g^{-1}$ | $S_{meso}$/ $m^2$ $g^{-1}$ | $V_{micro}$/ ml $g^{-1}$ | Cavitation/% | MVE/μl $g^{-1}$ $\%^{-1}$ |
|---|---|---|---|---|---|---|---|
| Parent | — | 0.19 | 615 | 140 | 0.25 | 12 | — |
| CE71 | 71 | 0.33 | 715 | 177 | 0.28 | 8 | 5 |
| E72 | 73 | 0.47 | 669 | 218 | 0.23 | 2 | 10 |

TABLE 13

Properties of parent and metal-containing mesoporous low-SAR USY zeolites.

| Sample | $V_{micro}$ ml $g^{-1}$ | $V_{meso}$ ml $g^{-1}$ | B μmol $g^{-1}$ | L μmol $g^{-1}$ | B + L μmol $g^{-1}$ | Si/Al/mol $mol^{-1}$ | Me/ wt. % | L/(B + L)/ mol $mol^{-1}$ |
|---|---|---|---|---|---|---|---|---|
| Parent | 0.25 | 0.19 | 227 | 160 | 387 | 5.5 | 0.01 | 0.41 |
| CE73 | 0.26 | 0.35 | 420 | 165 | 585 | 5.1 | 0.39 | 0.28 |
| E74 | 0.19 | 0.51 | 303 | 324 | 627 | 3.9 | 2.52 | 0.52 |

Examples 75 and 76: Acidity and Metal Dispersion on ZSM-23

The parent ZSM-23, CE29, and E33 from Table 5 were exposed to the standard ion exchange and calcination as described for E68, followed by an impregnation as for E68 (using $Pt(NH_3)_4(NO_3)_2$ salt instead of magnesium nitrate, and a targeted concentration of 2 wt % instead of 0.5 wt %), followed by drying at 110° C. for 1 h, calcination under air at 300° C. for 6 h (ramp rate 1° C./min). The obtained samples were exposed to acidity, composition, and metal dispersion characterization.

All three samples displayed a Mg content below 0.02 wt % and a Pt content of ca 1.9 wt %. Samples CE75 and E76, respectively, both display a reduction in Brønsted acidity as compared to the parent zeolite (Table 14). However, this reduction is much smaller for the inventive sample, demonstrating that the invention enables to preserve the intrinsic zeolitic Brønsted acidity to a much larger degree. In addition, the invention enables to yield superior noble metal dispersions compared to zeolites using state of the art metal deposition technologies,

TABLE 14

Acidity and metal dispersion of Pt/ZSM-23 zeolites.

| Sample | B/μmol $g^{-1}$ | Pt Dispersion/% |
|---|---|---|
| Parent | 346 | 9 |
| CE75 | 247 | 49 |
| E76 | 281 | 58 |

Examples 77-82: Comparison to State of the Art Zeolite/Composite Technologies In order to clearly distinguish the materials derived from the inventive from state of the art materials, a ZSM-5 zeolite with atomic Si/Al=15 was exposed to inventive and state of the art treatments.

The inventive example E77 were carried similar to Example 1, with the exception that the zeolite content was doubled, that the concentration of added base (Step B in Process A) was 14 M instead of 2 M, and that no subsequent acid treatment was performed. For the inventive example E78, the solid obtained by E77 was exposed to a subsequent acid treatment as was performed in Example 1.

The state of the art treatments were executed based on the teachings disclosed in WO2017/009664. Accordingly, 0.5 g of parent ZSM-5 was dispersed in 100 ml of water for 30 min. Next, 530 mg of $Na_2CO_3$ was added to the abovementioned dispersion to form Solution A, being a suspension with an alkaline pH of roughly 10. Next, 96 ml of an aqueous solution of magnesium nitrate (4.8 mmol) and aluminium nitrate (2.4 mmol) was added dropwise to Solution A over a period of 1.5 hour, during which the pH was kept in between 9.5 and 10.5 by dropwise addition of 1 M NaOH. After stirring for another hour, the solid was separated using the filtration as mentioned in Example 1, and then re-dispersed in 200 ml demi water to be stirred for another hour. This re-dispersion was repeated one more time, after which collected solids were dried at 1200 overnight, finally yielding material CE79. Next, this sample was executed to the same acid treatment executed for E78, yielding CE80.

For both inventive (E77) and state of the treatment (CE79) substantial mesoporosity is formed and that the microporosity is reduced (likely due to the presence of amorphous precipitated species) (Table 15). However, clear differences are evidenced after further the application of a routine acid treatment aimed at removal of the deposited amorphous species. Whereas in the invention (E78) a relatively high yield is combined with a(nother) boost of the zeolite's porosity on all accounts, for the state of art sample (E80) a very low yield is combined with similar (or even lower) porosity compared to that of the parent zeolite. This proves that the mesoporosity of sample CE79 must be entirely due to the presence of the amorphous phase, and that this treatment does not enable to yield a mesoporous zeolite but a zeolite/mesoporous material composite, and therefore forms in no way prior art to the herein described invention.

TABLE 15

| Comparison of the invention to state of the art Mg deposition metals. | | | | | |
|---|---|---|---|---|---|
| Sample | Yield/% | $V_{meso}$/ ml $g^{-1}$ | $S_{BET}$/ $m^2$ $g^{-1}$ | $S_{meso}$/ $m^2$ $g^{-1}$ | $V_{micro}$/ ml $g^{-1}$ |
| Parent | — | 0.08 | 293 | 86 | 0.11 |
| E77 | 64 | 0.21 | 263 | 175 | 0.09 |
| E78 | 89 | 0.34 | 453 | 198 | 0.13 |
| CE79 | 194 | 0.54 | 270 | 135 | 0.07 |
| CE80 | 18 | 0.10 | 252 | 79 | 0.10 |

Examples 81 and 82: Acidity Preservation in Low SAR ZSM-5

In order to clearly distinguish the materials derived from the inventive from state of the art materials, a ZSM-5 zeolite with atomic Si/Al=15 was exposed to inventive and state of the art treatments. Herein, the effect on the overall acidity as measured with ammonia TPD was monitored. The syntheses were carried similar to Example 1, with the exception that the zeolite amount was doubled, and that for the state of the art example (CE81), the concentration of added base (Step B in Process A) was 10 M instead of 2 M and that, instead of 0.05 M magnesium nitrate, 1.0 M of non-inventive NaCl salt was added, and that for the inventive example (E82), the concentration of added base was 14 M instead of 2 M. The base treated samples were both ion exchanged and calcined like described for E69. The properties of the resulting materials display that similar levels of mesopore volume are attained (Table 16), and that they are mostly free of metals (Mg content<0.1 wt % for all three samples).

Acidity analysis with $NH_3$-TPD demonstrates that the state of the art sample displays a pronounced one-third reduction in overall acidity. In contrast, the inventive sample displays an acidity that is boosted 17% compared to the parent sample, proving that the inventive technology enables also for this type of zeolite to maximize the preservation of intrinsic zeolitic properties.

TABLE 16

| Porosity and acidity of low SAR ZSM-5 zeolites. | | | |
|---|---|---|---|
| Sample | $V_{micro}$/ ml $g^{-1}$ | $V_{meso}$/ ml $g^{-1}$ | $NH_3$/ μmol $g^{-1}$ |
| Parent | 0.11 | 0.08 | 971 |
| CE81 | 0.09 | 0.52 | 616 |
| E82 | 0.08 | 0.44 | 1135 |

The invention claimed is:

1. A process for increasing mesoporosity in zeolites, the process comprising (a), (b), and (c) in consecutive sequence:

(a) preparing a suspension of a zeolite in an aqueous solution of pH less than 8, in which at least one salt is dissolved, wherein a ratio of the zeolite to the aqueous solution is greater than or equal to 1 gram per liter and less than or equal to 400 grams per liter;

(b) adding a base to the suspension of (a), thereby increasing the pH to a value from 11 to 14 and precipitating the at least one salt, and letting the base react in the suspension, thereby increasing the mesoporosity of the zeolite to a mesopore volume of greater than or equal to 0.3 ml/g, wherein: (b) is executed at a temperature from 25° C. to 100° C., over a time period from 1 minute to 6 hours, with a solid-to-liquid ratio of 5 grams to 300 grams solid per liter of liquid, and at a concentration of base from 2 mmol to 25 mmol of the base per gram of the zeolite of (a), and the base is added gradually over the time period; and (c) isolating the zeolite from the suspension of (b);

wherein the at least one salt is selected from the group consisting of $Ba(NO_3)_2$, $Ca(NO_3)_2$, $Ca(OH)_2$, $CaCO_3MgO$, Ti-propoxide, $Cu(NO_3)_2$, $Cu(OH)_2$, $CuCl_2$, $Fe(NO_3)_3$, $FeSO_4$, $Mg(NO_3)_2$, $MgCl_2$, $MgNH_4PO_4$, $MgHPO_4$, $Mn(NO_3)_2$, $Co(NO_3)_2$, $Ni(NO_3)_2$, $NiCO_3$, $SnCl_2LaCl_3$, $CeCl_3$*7 H2O, Mg(acetate), or combinations thereof.

2. The process of claim 1, wherein the zeolite has a framework topology selected from the group consisting of FAU, BEA, MFI, MOR, TON, MTT, BEA, CHA, AEL, LTL, MTW, MWW, MEL, FER, MRE, and EUO.

3. The process of claim 1, wherein the suspension in (a) contains from 0.01 grams of the salt per gram of the zeolite to 2 grams of the salt per gram of the zeolite.

4. The process of claim 1, wherein the base is an inorganic base selected from the group consisting of NaOH, KOH, CsOH, LiOH, and $NH_4OH$.

5. The process of claim 1, further comprising executing a complementary acid treatment on the zeolite isolated in (c) with an aqueous solution comprising an acid.

6. The process of claim 5, wherein the complementary acid treatment is executed gradually.

7. The process of claim 5, wherein the acid comprises an inorganic acid selected from the group consisting of HCl, $HNO_3$, $H_2SO_4$, $H_3PO_4$, and $H_3BO_3$.

8. The process of claim 5, wherein the acid comprises an organic acid selected from the group consisting of oxalic acid, malic acid, citric acid, acetic acid, benzoic acid, formic acid, monosodium citrate, disodium citrate, trisodium citrate, ethylenediaminetetraacetic acid ($H_4$EDTA), and disodium ethylenediaminetetraacetic acid ($Na_2H_2$EDTA).

9. The process of claim 5, wherein:

the complementary acid treatment is executed at a temperature from 25° C. to 100° C., over a time period from 15 minutes to 24 hours; and the aqueous solution comprising the acid has a solid-to-liquid ratio of from 10 grams to 300 grams solid per liter of liquid, and a concentration of acid from 0.25 mmol to 50 mmol acid per gram of the zeolite obtained in (c).

10. The process of claim 1, further comprising:

executing a complementary ion exchange treatment on the zeolite isolated in (c); and optionally, before executing the complementary ion exchange treatment, executing a complementary acid treatment on the zeolite isolated in (c) with an aqueous solution comprising an acid.

11. The process of claim 10, wherein:

the complementary ion exchange treatment is executed using an aqueous solution containing an ammonium salt;

the ion exchange treatment is executed at a temperature from 25° C. to 100° C., over a time period from 15 minutes to 24 hours; and the aqueous solution has a solid-to-liquid ratio of 10 grams to 300 grams of solid per liter of liquid, and a concentration of ammonium salt from 0.25 mmol to 50 mmol ammonium salt per gram of the zeolite in the aqueous solution.

12. The process of claim 11, wherein the ammonium salt is selected from the group consisting of ammonium nitrate, ammonium sulphate, ammonium chloride, ammonium hydroxide, ammonium carbonate, monoammonium phosphate, diammonium phosphate, and ammonium acetate.

13. The process of claim 1, wherein the at least one salt is selected from the group consisting of $Ca(NO_3)_2$, Ti-propoxide, $Cu(NO_3)_2$, $CuCl_2$, $Fe(NO_3)_3$, $FeSO_4$, $Mg(NO_3)_2$, $MgHPO_4$, $Zn(NO_3)_2$, $Co(NO_3)_2$, $Ni(NO_3)_2$, $(NH_4)_6Mo_7O_{24}$, or combinations thereof.

14. The process of claim 1, wherein the zeolite produced from the process is a zeolite with MFI topology and having:

an atomic Si/Al ratio of at least 60, a $V_{micro,0.01}$ of at least 0.10 mL/g, a $V_{meso,0.2-1}$ of at least 0.30 mL/g, and a Lewis acidity as measured with pyridine of at least 100 μmol/g.

15. The process of claim 1, wherein the zeolite produced from the process is a zeolite with FAU topology and having:

an atomic Si/Al ratio of at least 3.5, a $V_{micro}$ of at least 0.18 mL/g, a $V_{meso}$ of at least 0.30 mL/g, and a Lewis acidity as measured with pyridine of at least 250 μmol/g.

16. The process of claim 1, wherein (b) is executed over a time period from 7 minutes to 60 minutes and wherein the gradual addition of the base is performed such that the maximum amount of base added over a period of less than 3 minutes is not more than 50% of the overall amount of base added in (b).

* * * * *